(12) United States Patent
Hosseini et al.

(10) Patent No.: US 11,997,690 B2
(45) Date of Patent: May 28, 2024

(54) APERIODIC CHANNEL STATE INFORMATION REFERENCE SIGNAL RATE MATCHING

(71) Applicant: Qualcomm Incorporated, San Diego, CA (US)

(72) Inventors: Seyedkianoush Hosseini, San Diego, CA (US); Alexandros Manolakos, Escondido, CA (US); Peter Gaal, San Diego, CA (US); Wanshi Chen, San Diego, CA (US); Joseph Binamira Soriaga, San Diego, CA (US); Alexei Yurievitch Gorokhov, San Diego, CA (US); Yu Zhang, Beijing (CN); Tao Luo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 17/267,191

(22) PCT Filed: Aug. 8, 2019

(86) PCT No.: PCT/CN2019/099730
§ 371 (c)(1),
(2) Date: Feb. 9, 2021

(87) PCT Pub. No.: WO2020/030032
PCT Pub. Date: Feb. 13, 2020

(65) Prior Publication Data
US 2021/0307054 A1    Sep. 30, 2021

(30) Foreign Application Priority Data
Aug. 10, 2018  (WO) ................ PCT/CN2018/099922

(51) Int. Cl.
H04W 72/00    (2023.01)
H04L 5/00     (2006.01)
H04W 72/23    (2023.01)

(52) U.S. Cl.
CPC .......... H04W 72/23 (2023.01); H04L 5/0048 (2013.01)

(58) Field of Classification Search
CPC ..... H04L 1/0013; H04L 5/001; H04L 5/0048; H04L 5/0051; H04L 5/0094; H04W 72/23
See application file for complete search history.

(56) References Cited

U.S. PATENT DOCUMENTS 10,790,892 B2 *  9/2020  Manolakos ........... H04L 5/0094
11,489,618 B2 * 11/2022  Muruganathan ...... H04L 5/0044
(Continued)

FOREIGN PATENT DOCUMENTS

CN    103069875 A    4/2013
CN    107733602 A    2/2018
(Continued)

OTHER PUBLICATIONS

Ericsson, On rate matching using ZP CSI-RS and CSI-IM, 3GPP TSG RAN WG1 Meeting AH 1801, R1-1800694, 8 pages, Jan. 26, 2018.*
(Continued)

Primary Examiner — Frank Duong
(74) Attorney, Agent, or Firm — QUALCOMM Incorporated

(57) ABSTRACT

Methods, systems, and devices for wireless communications are described. A user equipment (UE) may receive a downlink control information message scheduling a downlink transmission that comprises a zero-power reference signal for the UE to use for rate matching during the downlink transmission. The UE may receive a signal triggering trans-
(Continued)

mission of an aperiodic reference signal during the downlink transmission. The UE may determine whether the UE supports search space sharing. The UE may perform, upon determining that the UE supports search space sharing, rate matching around the aperiodic reference signal.

10 Claims, 15 Drawing Sheets

(56) References Cited

U.S. PATENT DOCUMENTS

| | | | | |
|---|---|---|---|---|
| 2014/0126485 | A1* | 5/2014 | Chen | H04L 5/001 370/328 |
| 2014/0126490 | A1* | 5/2014 | Chen | H04L 5/0035 370/328 |
| 2016/0227548 | A1* | 8/2016 | Nimbalker | H04L 1/0039 |
| 2018/0013528 | A1* | 1/2018 | Yamada | H04L 5/0037 |
| 2018/0323830 | A1* | 11/2018 | Park | H04L 25/02 |
| 2019/0028250 | A1* | 1/2019 | Chen | H04L 5/0094 |
| 2019/0313385 | A1* | 10/2019 | Yang | H04L 1/189 |

FOREIGN PATENT DOCUMENTS

| | | |
|---|---|---|
| CN | 107888362 A | 4/2018 |
| EP | 2916607 A1 | 9/2015 |
| WO | WO-2017148364 A1 | 9/2017 |
| WO | WO-2017173314 A1 | 10/2017 |
| WO | WO-2018028680 A1 | 2/2018 |
| WO | WO-2018063072 A1 | 4/2018 |

OTHER PUBLICATIONS

CATT: "Remaining Issues on CSI-RS", R1-1801723, 3GPP TSG RAN WG1 Meeting #92, Athens, Greece, Feb. 26-Mar. 2, 2018, Mar. 2, 2018, 9 Pages.

International Search Report and Written Opinion—PCT/CN2019/099730—ISA/EPO—dated Oct. 29, 2019 (184442WO2).
Ericsson: "Joint Activation of Aperiodic/Semi-Persistent CSI-IM and ZP CSI-RS", 3GPP TSG RAN WG1 Meeting #92, R1-1802747, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018, 5 Pages, Feb. 17, 2018, XP051398179.
Ericsson: "On Rate Matching using ZP CSI-RS and CSI-IM", 3GPP TSG RAN WG1 Meting AH 1801, R1-1800694, 3rd Generation Partnership Project, Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, 8 Pages, Jan. 13, 2018, XP051385012.
Supplementary European Search Report—EP19847720—Search Authority—The Hague—dated Aug. 2, 2022. (184442EP).
Alcatel-Lucent Shanghai Bell, et al., "Search Space Sharing with GIF", 3GPP TSG RAN WG1 Meeting #61bis, 3GPP Draft, R1-104076_Search Space Sharing With CIF_Final, 3rd Generation Partnership Project (3GPP), Mobile Competence Centre, 650, Route Des Lucioles, F-06921 Sophia-Antipolis Cedex, France, vol. RAN WG1, No. Dresden, Germany, Jun. 28, 2010-Jul. 2, 2010, 4 Pages, Jun. 23, 2010 (Jun. 23, 2010), XP050598503, [retrieved on Jun. 23, 2010] the whole document.
International Search Report and Written Opinion—PCT/CN2018/099922—ISA/EPO—dated Mar. 27, 2019 (184442WO1).
LG Electronics: "DL CC Selection for Aperiodic CSI Triggering", 3GPP TSG RAN WG1 Meeting #63, 3GPP Draft, R1-106134 DL CC Selection for Aperiodic CSI Triggering-LGE, 3rd Generation Partnership Project (3GPP), Mobile Competence Centre, 650, Route Des Lucioles, F-06921 Sophia-Antipolis Cedex, France, vol. RAN WG1, No. Jacksonville, USA, Nov. 15, 2010-Nov. 19, 2010, 5 Pages, Nov. 9, 2010 (Nov. 9, 2010), XP050466880, [retrieved on Nov. 9, 2010] the whole document.
Supplementary Partial European Search Report—EP19847720—Search Authority—The Hague—dated Apr. 7, 2022 (184442EP).

* cited by examiner

APERIODIC CHANNEL STATE INFORMATION REFERENCE SIGNAL RATE MATCHING

CROSS REFERENCE TO RELATED APPLICATIONS

The present Application is a 371 national phase filing of International Patent Application No. PCT/CN2019/099730 by HOSSEINI et al., entitled "APERIODIC CHANNEL STATE INFORMATION REFERENCE SIGNAL RATE MATCHING," filed Aug. 8, 2019; and to International Patent Application No. PCT/CN2018/099922 by HOSSEINI et al., entitled "APERIODIC CHANNEL STATE INFORMATION REFERENCE SIGNAL RATE MATCHING," filed Aug. 10, 2018, each of which is assigned to the assignee hereof and each of which is hereby incorporated by reference in its entirety.

BACKGROUND

The following relates generally to wireless communications, and more specifically to aperiodic channel state information reference signal (A-CSI-RS) rate matching rules.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems typically use reference signals for various functions. For example, reference signals may be used for channel performance measurements, location tracking, rate matching, beam management, and the like. Reference signals may be scheduled as needed (e.g., aperiodic) or according to a schedule (e.g., according to a periodic schedule, scheduled during a given downlink transmission, and the like). Example reference signals include, but are not limited to, CSI-RS, demodulation reference signal (DMRS), sounding reference signal (SRS), tracking (or position) reference signal (TRS), and the like. Typically, the base station may schedule resources for an uplink or downlink transmission that includes one or more reference signals and data signals. However, in some instances additional aperiodic reference signals may also be scheduled on the same carrier and/or on a different carrier used for the transmission. For example, conventional networks typically do not permit rate matching during a downlink transmission around an aperiodic reference signal that has been triggered using an uplink control signal. Accordingly, this may limit rate matching operations at the UE during the downlink transmission.

SUMMARY

The described techniques relate to improved methods, systems, devices, and apparatuses that support aperiodic channel state information reference signal (A-CSI-RS) rate matching. Generally, the described techniques provide for several rules, systems, procedures, or mechanisms by which the UE may or may not rate match around an aperiodic reference signal during a downlink transmission. Broadly, aspects of the described techniques may relate to a downlink control information (DCI) message for an uplink grant triggering transmission of the aperiodic reference signals. In one example, the UE may be configured with a zero power (ZP) reference signal (such as a ZP-CSI-RS) to be used for rate matching during a downlink transmission. The UE may also receive a signal that triggers an aperiodic reference signal (e.g., an A-CSI-RS) during the downlink transmission. The ZP reference signal and the aperiodic reference signal may be associated with the same carrier or with different carriers. In some aspects, rate matching around the aperiodic reference signal may be supported only when the UE supports search space sharing. For example, the UE may determine that it does not support search space sharing and perform rate matching around the ZP reference signal (and not the aperiodic reference signal) during the downlink transmission. As another example, the UE may determine that it does support search space sharing and perform rate matching around the ZP reference signal and/or the aperiodic reference signal. In some aspects, the ZP-CSI-RS may be triggered by a downlink DCI and the non-ZP-CSI-RS (e.g., the aperiodic reference signal) may be triggered by the uplink DCI.

Additionally or alternatively, rate matching around the aperiodic reference signal may be supported when a signal triggering the aperiodic reference signal is received far enough in advance of the downlink transmission. For example, the UE may receive the signal triggering the transmission of the aperiodic reference signal. The UE may determine whether the signal was received during a given time period, e.g., such as a defined window or time period. Generally, the time period may be based on or otherwise associated with a certain number of symbols or slots before a first symbol of the downlink transmission, before a first symbol of a resource grant for the downlink transmission, and the like. When the signal triggering the aperiodic reference signal is received within the defined time period, the UE may perform rate matching around the aperiodic reference signal during the downlink transmission.

Additionally or alternatively, rate matching around the aperiodic reference signal may be supported when the aperiodic reference signal is triggered on the same component carrier as is used for the downlink transmission. For example, the UE may receive a signal triggering transmission of the aperiodic reference signal and then receive a resource grant allocating resources for the downlink transmission. The signal and the resource grant may both carry or otherwise provide an indication that the same component carrier is being used. Accordingly, the UE may perform rate matching around the aperiodic reference signal during the downlink transmission.

Additionally or alternatively, rate matching may be performed based on the resource grant corresponding to the downlink transmission also triggering transmission of the aperiodic reference signals. For example, the UE may receive a first resource grant for a first downlink transmission during a first time period. The first resource grant may trigger a corresponding first reference signal during the downlink transmission. Later, the UE may receive a second resource grant for a second downlink transmission during a second time period that at least partially overlaps with the first time period. The second resource grant may trigger an aperiodic reference signal during the second downlink transmission. The UE may refrain from performing rate matching around the first reference signal during a portion of the first downlink transmission that overlaps with the second downlink transmission and, instead, perform rate matching around the aperiodic reference signal during the second downlink transmission.

A method of wireless communication at a UE is described. The method may include receiving a downlink control information message scheduling a downlink transmission that includes a zero-power reference signal for the UE to use for rate matching during the downlink transmission, receiving a signal triggering transmission of an aperiodic reference signal during the downlink transmission, determining whether the UE supports search space sharing, and performing, upon determining that the UE supports search space sharing, rate matching around the aperiodic reference signal.

An apparatus for wireless communication at a UE is described. The apparatus may include a processor, memory in electronic communication with the processor, and instructions stored in the memory. The instructions may be executable by the processor to cause the apparatus to receive a downlink control information message scheduling a downlink transmission that includes a zero-power reference signal for the UE to use for rate matching during the downlink transmission, receive a signal triggering transmission of an aperiodic reference signal during the downlink transmission, determine whether the UE supports search space sharing, and perform, upon determining that the UE supports search space sharing, rate matching around the aperiodic reference signal.

Another apparatus for wireless communication at a UE is described. The apparatus may include means for receiving a downlink control information message scheduling a downlink transmission that includes a zero-power reference signal for the UE to use for rate matching during the downlink transmission, receiving a signal triggering transmission of an aperiodic reference signal during the downlink transmission, determining whether the UE supports search space sharing, and performing, upon determining that the UE supports search space sharing, rate matching around the aperiodic reference signal.

A non-transitory computer-readable medium storing code for wireless communication at a UE is described. The code may include instructions executable by a processor to receive a downlink control information message scheduling a downlink transmission that includes a zero-power reference signal for the UE to use for rate matching during the downlink transmission, receive a signal triggering transmission of an aperiodic reference signal during the downlink transmission, determine whether the UE supports search space sharing, and perform, upon determining that the UE supports search space sharing, rate matching around the aperiodic reference signal.

Some examples of the method, apparatuses, and non-transitory computer-readable medium described herein may further include operations, features, means, or instructions for refraining from performing, upon determining that the UE does not support search space sharing, rate matching around the aperiodic reference signal.

Some examples of the method, apparatuses, and non-transitory computer-readable medium described herein may further include operations, features, means, or instructions for determining that the UE does not support search space sharing, determining that the signal triggering transmission of the aperiodic reference signal was received on resources that at least partially overlap with resources for the downlink control information message and performing, based on the at least partially overlapping resources, rate matching around the aperiodic reference signal.

In some examples of the method, apparatuses, and non-transitory computer-readable medium described herein, the signal triggering transmission of the aperiodic reference signal includes a downlink control information message associated with an uplink transmission.

A method of wireless communication at a UE is described. The method may include receiving, from a base station, a signal triggering transmission of an aperiodic reference signal during a downlink transmission from the base station, where the signal triggering transmission of the aperiodic reference signal includes a downlink control information message associated with an uplink grant, determining that the signal was received during a defined time period before the downlink transmission occurs, and performing, based on the determining, rate matching around the aperiodic reference signal during the downlink transmission.

An apparatus for wireless communication at a UE is described. The apparatus may include a processor, memory in electronic communication with the processor, and instructions stored in the memory. The instructions may be executable by the processor to cause the apparatus to receive, from a base station, a signal triggering transmission of an aperiodic reference signal during a downlink transmission from the base station, where the signal triggering transmission of the aperiodic reference signal includes a downlink control information message associated with an uplink grant, determine that the signal was received during a defined time period before the downlink transmission occurs, and perform, based on the determining, rate matching around the aperiodic reference signal during the downlink transmission.

Another apparatus for wireless communication at a UE is described. The apparatus may include means for receiving, from a base station, a signal triggering transmission of an aperiodic reference signal during a downlink transmission from the base station, where the signal triggering transmission of the aperiodic reference signal includes a downlink control information message associated with an uplink grant, determining that the signal was received during a defined time period before the downlink transmission occurs, and performing, based on the determining, rate matching around the aperiodic reference signal during the downlink transmission.

A non-transitory computer-readable medium storing code for wireless communication at a UE is described. The code may include instructions executable by a processor to receive, from a base station, a signal triggering transmission of an aperiodic reference signal during a downlink transmission from the base station, where the signal triggering transmission of the aperiodic reference signal includes a downlink control information message associated with an uplink grant, determine that the signal was received during a defined time period before the downlink transmission occurs, and perform, based on the determining, rate matching around the aperiodic reference signal during the downlink transmission.

In some examples of the method, apparatuses, and non-transitory computer-readable medium described herein, the defined time period includes receiving the signal a defined number of symbols or slots before receiving a first symbol containing a resource grant for the downlink transmission.

In some examples of the method, apparatuses, and non-transitory computer-readable medium described herein, the defined time period includes receiving the signal a defined number of symbols or slots before a first symbol of the downlink transmission occurs.

Some examples of the method, apparatuses, and non-transitory computer-readable medium described herein may further include operations, features, means, or instructions for receiving a signal identifying the defined time period.

Some examples of the method, apparatuses, and non-transitory computer-readable medium described herein may further include operations, features, means, or instructions for transmitting an indication of a capability configuration to the base station and receiving a signal identifying the defined time period, where the defined time period may be based on the capability configuration.

In some examples of the method, apparatuses, and non-transitory computer-readable medium described herein, the capability configuration may be based on one or more of a numerology of a carrier carrying the signal triggering transmission of the aperiodic reference signal, a numerology of a carrier carrying a resource grant for the downlink transmission, a numerology of a carrier carrying the downlink transmission, or a combination thereof.

A method of wireless communication at a UE is described. The method may include receiving, from a base station, a signal triggering transmission of an aperiodic reference signal on a component carrier during a downlink transmission from the base station, receiving, from the base station, a resource grant allocating resources for the downlink transmission, where the resource grant indicates the downlink transmission uses the component carrier, and performing, based on the aperiodic reference signal and the resource grant, rate matching around the aperiodic reference signal during the downlink transmission.

An apparatus for wireless communication at a UE is described. The apparatus may include a processor, memory in electronic communication with the processor, and instructions stored in the memory. The instructions may be executable by the processor to cause the apparatus to receive, from a base station, a signal triggering transmission of an aperiodic reference signal on a component carrier during a downlink transmission from the base station, receive, from the base station, a resource grant allocating resources for the downlink transmission, where the resource grant indicates the downlink transmission uses the component carrier, and perform, based on the aperiodic reference signal and the resource grant, rate matching around the aperiodic reference signal during the downlink transmission.

Another apparatus for wireless communication at a UE is described. The apparatus may include means for receiving, from a base station, a signal triggering transmission of an aperiodic reference signal on a component carrier during a downlink transmission from the base station, receiving, from the base station, a resource grant allocating resources for the downlink transmission, where the resource grant indicates the downlink transmission uses the component carrier, and performing, based on the aperiodic reference signal and the resource grant, rate matching around the aperiodic reference signal during the downlink transmission.

A non-transitory computer-readable medium storing code for wireless communication at a UE is described. The code may include instructions executable by a processor to receive, from a base station, a signal triggering transmission of an aperiodic reference signal on a component carrier during a downlink transmission from the base station, receive, from the base station, a resource grant allocating resources for the downlink transmission, where the resource grant indicates the downlink transmission uses the component carrier, and perform, based on the aperiodic reference signal and the resource grant, rate matching around the aperiodic reference signal during the downlink transmission.

In some examples of the method, apparatuses, and non-transitory computer-readable medium described herein, the signal triggering transmission of the aperiodic reference signal does not trigger cross-component carrier transmission of the aperiodic reference signal.

In some examples of the method, apparatuses, and non-transitory computer-readable medium described herein, the resource grant does not trigger cross-component carrier transmission of the downlink transmission.

In some examples of the method, apparatuses, and non-transitory computer-readable medium described herein, the signal triggering transmission of the aperiodic reference signal includes a downlink control information message associated with an uplink transmission.

A method of wireless communication at a UE is described. The method may include receiving, from a base station, a first resource grant for a first downlink transmission from the base station during a first time period, the first resource grant triggering transmission of a first reference signal during the first downlink transmission, receiving, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission, refraining from performing rate matching around the first reference signal during a portion of the first time period for the first downlink transmission that overlaps with the second time period for the second downlink transmission, and performing rate matching around the aperiodic reference signal during the second downlink transmission.

An apparatus for wireless communication at a UE is described. The apparatus may include a processor, memory in electronic communication with the processor, and instructions stored in the memory. The instructions may be executable by the processor to cause the apparatus to receive, from a base station, a first resource grant for a first downlink transmission from the base station during a first time period, the first resource grant triggering transmission of a first reference signal during the first downlink transmission, receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission, refrain from performing rate matching around the first reference signal during a portion of the first time period for the first downlink transmission that overlaps with the second time period for the second downlink transmission, and perform rate matching around the aperiodic reference signal during the second downlink transmission.

Another apparatus for wireless communication at a UE is described. The apparatus may include means for receiving, from a base station, a first resource grant for a first downlink transmission from the base station during a first time period, the first resource grant triggering transmission of a first reference signal during the first downlink transmission, receiving, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission, refraining from performing rate matching around the first reference signal during a portion of the first time period for the first downlink transmission that overlaps with the second time period for the second downlink transmission, and performing rate matching around the aperiodic reference signal during the second downlink transmission.

A non-transitory computer-readable medium storing code for wireless communication at a UE is described. The code may include instructions executable by a processor to receive, from a base station, a first resource grant for a first downlink transmission from the base station during a first time period, the first resource grant triggering transmission of a first reference signal during the first downlink transmission, receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission, refrain from performing rate matching around the first reference signal during a portion of the first time period for the first downlink transmission that overlaps with the second time period for the second downlink transmission, and perform rate matching around the aperiodic reference signal during the second downlink transmission.

DETAILED DESCRIPTION

Figure 1:
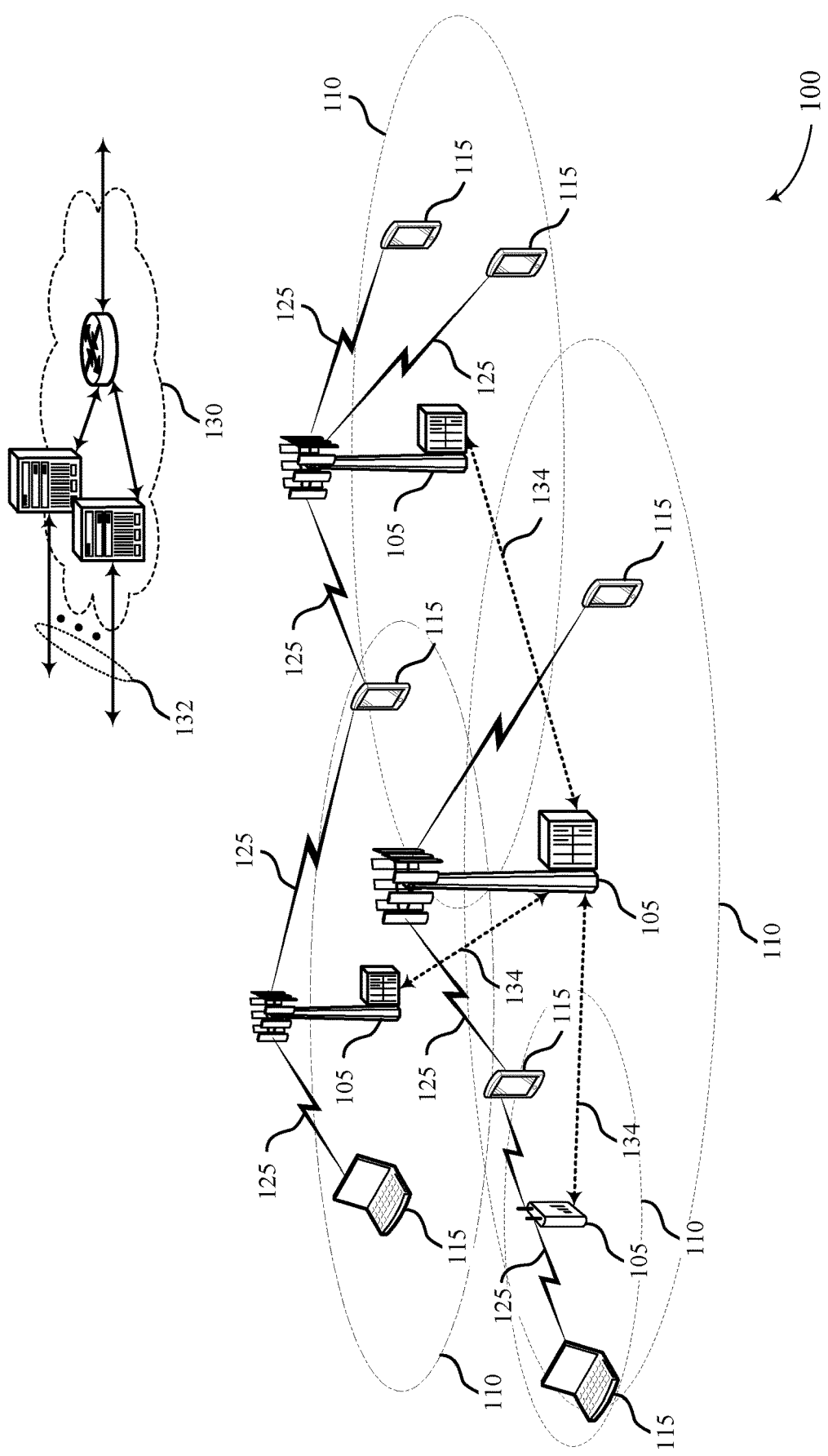
FIG. 1 illustrates an example of a system for wireless communications that supports aperiodic channel state information reference signal (A-CSI-RS) rate matching rules in accordance with aspects of the present disclosure.

Wireless communication systems use reference signals for various functions, e.g., channel performance measurements, location tracking, rate matching, beam management, and the like. Reference signals may be scheduled as needed (e.g., aperiodic) or according to a defined schedule (e.g., according to a periodic schedule, scheduled during a given downlink transmission, and the like). Example reference signals include, but are not limited to, a channel state information reference signal (CSI-RS), a demodulation reference signal (DMRS), a sounding reference signal (SRS), a tracking (or position) reference signal (TRS), and the like. Typically, the base station may schedule resources for a downlink transmission that includes resources for reference signals, as well as the resources for the data signals communicated during the downlink transmission. However, in some instances additional aperiodic reference signals may also be scheduled on the same carrier and/or on a different carrier as is used for the downlink transmission. For example, conventional networks typically do not permit rate matching during a downlink transmission around an aperiodic reference signal that has been triggered using an uplink control signal, such as by a downlink control information (DCI) for an uplink grant (e.g., an uplink DCI). Accordingly, this may limit rate matching operations at the UE during the downlink transmission.

Aspects of the disclosure are initially described in the context of a wireless communications system. Generally, the described techniques provide for rules or mechanisms by which the UE may determine whether to rate match around an aperiodic reference signal during a downlink transmission. Broadly, aspects of the described techniques may relate to a DCI message for an uplink grant (e.g., an uplink DCI) triggering transmission of aperiodic reference signals, such as A-CSI-RS. In one example, the UE may be configured with a zero power (ZP) reference signal to be used for rate matching during the downlink transmission. The UE may also receive a signal that triggers an aperiodic reference signal (e.g., an A-CSI-RS) during the downlink transmission. The ZP reference signal and the aperiodic reference signal may be associated with the same carrier or with different carriers. In some aspects, rate matching around the aperiodic reference signal may be supported only when the UE supports search space sharing. For example, the UE may determine that it does not support search space sharing and perform rate matching around the ZP reference signal (but not the aperiodic reference signal) during the downlink transmission. As another example, the UE may determine that it does support search space sharing and perform rate matching around the ZP reference signal and/or the aperiodic reference signal.

Additionally or alternatively, rate matching around the aperiodic reference signal may be supported when a signal triggering the aperiodic reference signal is received far enough in advance of the downlink transmission. For example, the UE may receive the signal triggering the transmission of the aperiodic reference signal. The UE may determine whether the signal was received during the given time period, e.g., such as a defined window or time period.

Generally, the time period may be based on or otherwise associated with a certain number of symbols or slots before a first symbol of the downlink transmission, before a first symbol of a grant of resources for the downlink transmission, and the like. When the signal triggering the aperiodic reference signal is received within the defined time period, the UE may perform rate matching around the aperiodic reference signal during the downlink transmission.

Additionally or alternatively, rate matching around the aperiodic reference signal may be supported when the aperiodic reference signal is triggered on the same component carrier as is used for the downlink transmission. For example, the UE may receive a signal triggering transmission of the aperiodic reference signal and then receive a resource grant allocating resources for the downlink transmission. The signal and the resource grant may both carry or otherwise provide an indication that the same component carrier is being used. Accordingly, the UE may perform rate matching around the aperiodic reference signal during the downlink transmission. In some aspects, rate matching around the aperiodic reference signal may be supported when the aperiodic reference signal is triggered on the same component carrier as the downlink grant (e.g., component carrier 1), but both are for a different component carrier (e.g., component carrier 2). That is, the signal triggering transmission of the aperiodic reference signal may be received on component carrier 1, but trigger transmission of the aperiodic reference signal on component carrier 2. Similarly, the downlink grant for the downlink transmission may be received on component carrier 1, but signal that the downlink transmission will occur on component carrier 2. Thus, the UE may perform rate matching around the aperiodic reference signal during the downlink transmission.

Additionally or alternatively, rate matching may be performed based on the resource grant corresponding to the downlink transmission also triggering transmission of the aperiodic reference signals. For example, the UE may receive a first resource grant for a first downlink transmission during a first time period. The first resource grant may trigger a corresponding first reference signal during the downlink transmission. Later, the UE may receive a second resource grant for a second downlink transmission during a second time period that at least partially overlaps with the first time period. The second resource grant may trigger an aperiodic reference signal during the second downlink transmission. The UE may refrain from performing rate matching around the first reference signal during a portion of the first downlink transmission that overlaps with the second downlink transmission and, instead, perform rate matching around the aperiodic reference signal during the second downlink transmission.

Aspects of the disclosure are further illustrated by and described with reference to apparatus diagrams, system diagrams, and flowcharts that relate to A-CSI-RS rate matching rules.

FIG. 1 illustrates an example of a wireless communications system 100 that supports A-CSI-RS rate matching rules in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive a DCI message scheduling a downlink transmission that comprises a zero-power reference signal for the UE 115 to use for rate matching during the downlink transmission. The UE 115 may receive a signal triggering transmission of an aperiodic reference signal during the downlink transmission. The UE 115 may determine whether the UE 115 supports search space sharing. The UE 115 may perform, upon determining that the UE 115 supports search space sharing, rate matching around the aperiodic reference signal.

In some aspects, a UE 115 may receive, from a base station 105, a signal triggering transmission of an aperiodic reference signal during a downlink transmission from the base station 105, wherein the signal triggering transmission of the aperiodic reference signal comprises a downlink control information message associated with an uplink grant. The UE 115 may determine that the signal was received during a defined time period before the downlink transmission occurs. The UE 115 may perform, based at least in part on the determining, rate matching around the aperiodic reference signal during the downlink transmission.

In some aspects, a UE 115 may receive, from a base station 105, a signal triggering transmission of an aperiodic reference signal on a component carrier during a downlink transmission from the base station 105. The UE 115 may receive, from the base station 105, a resource grant allocating resources for the downlink transmission, wherein the resource grant indicates the downlink transmission uses the component carrier. The UE 115 may perform, based at least in part on the aperiodic reference signal and the resource grant, rate matching around the aperiodic reference signal during the downlink transmission.

In some aspects, a UE 115 may receive, from a base station 105, a first resource grant for a first downlink transmission from the base station 105 during a first time period, the first resource grant triggering transmission of a first reference signal during the first downlink transmission. The UE 115 may receive, from the base station 105 and subsequent to receiving the first resource grant, a second resource grant for a second downlink transmission from the base station 105 during a second time period that at least partially overlaps with the second time period, the second resource grant triggering transmission of an aperiodic reference signal during the second downlink transmission. The UE 115 may refrain from performing rate matching around the first reference signal during a portion of the first time period for the first downlink transmission that overlaps with the second time period for the second downlink transmission. The UE 115 may perform rate matching around the aperiodic reference signal during the second downlink transmission.

Figure 2:
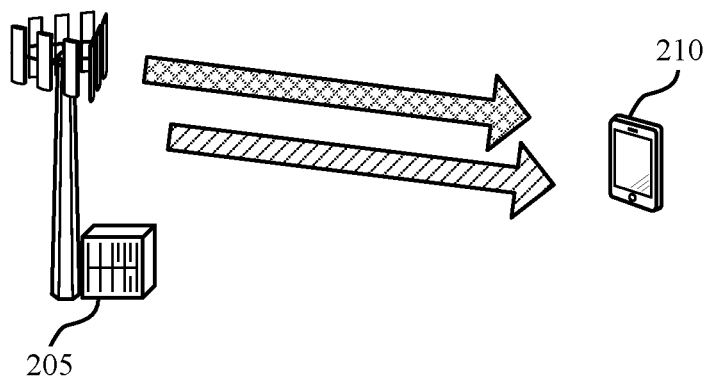
FIG. 2 illustrates an example of a wireless communication system that supports A-CSI-RS rate matching rules in accordance with aspects of the present disclosure.

FIG. 2 illustrates an example of a wireless communication system 200 that supports A-CSI-RS rate matching rules in accordance with aspects of the present disclosure. In some examples, wireless communication system 200 may implement aspects of wireless communication system 100. Wireless communication system 200 may include a base station 205 and the UE 210, which may be examples of the corresponding devices described herein.

Generally, wireless communication system 200 may be configured to support uplink and/or downlink communications between base station 205 and UE 210. In some aspects, the wireless communications may be grant-based communications, e.g., where base station 205 transmits a resource grant identifying resources for the transmissions. In some aspects, the resource grant may be carried in a DCI message. For example, UE 210 may be configured to monitor one or more control resource sets (CORESETs) within a search space for a resource grant. Once detected, UE 210 may decode the resource grant to identify the resources to use during the transmissions. Generally, the resource grant may include resources for one or more reference signals (e.g., CSI-RS, ZP-CSI-RS, and the like). UE 210 may utilize the reference signals for channel performance measurements, rate matching, position tracking, and other functions during the corresponding transmissions. Accordingly, base station 205 may transmit a downlink grant that configures or otherwise identifies resources for reference signals (e.g., ZP-CSI-RS). In some aspects, UE 210 may be configured to support cross component carrier scheduling, where the downlink transmission scheduling is supported using a carrier indication field (CIF) indicator that is included in the DCI carrying the downlink grant.

In some aspects, rate matching by UE 210 may be performed based on an indication carried in a DCI for the downlink grant. For example, base station 205 may configure UE 210 with one or more resource sets for the reference signals indicated in the downlink grant (e.g., the ZP-CSI-RS). In some aspects, this may include base station 205 transmitting (and UE 210 receiving) one or more RRC signals that configure the resource sets. In some aspects, a resource set may span multiple OFDM symbols. According to conventional techniques, rate matching for the downlink transmissions may not be performed before all grants are detected.

In some aspects, one or more aperiodic reference signals may also be configured. For example, base station 205 may transmit a DCI associated with an uplink grant (which may also be referred to as an uplink DCI) that triggers transmission of the aperiodic reference signals (e.g., A-CSI-RS). In some aspects, the uplink DCI may carry a defined number of bits (e.g., up to 6 bits) that triggers the aperiodic reference signal. In some aspects, the uplink DCI may be transmitted on a first component carrier, whereas the reference signals triggered by the downlink grant may be transmitted on a second component carrier. Aspects of the described techniques provide a mechanism that, at least to some degree, make rate matching independent of the aperiodic reference signal triggered by the uplink DCI (e.g., the uplink grant).

In some aspects, this may include rate matching around an aperiodic reference signal that is triggered by an uplink DCI being supported only when UE 210 supports search space sharing. Generally, each search space may be associated with, or otherwise defined for, a particular CIF indicator. As one nonlimiting example, three search spaces (SS0, SS1, and SS2) may be associated or defined with a corresponding CIF indicator (CIF0, CIF1, and CIF2). When search space sharing is not enabled, the downlink grant (e.g., PDCCH) with CIF0 may only appear in SS0. When search space sharing is enabled, the downlink grant with CIF0 may appear in any of SS0, SS1, or SS2. In some aspects, UE 210 being configured for search space sharing may also indicate or otherwise be associated with UE 210 supporting CA, cross component carrier scheduling, and the like. Generally, cross component carrier scheduling may include base station 205 transmitting (and UE 210 receiving) a downlink grant on a first component carrier that schedules a downlink transmission on a second component carrier.

Aspects of the described techniques provide rate matching rules for UE 210 to follow when an aperiodic reference signal is triggered in an uplink DCI. For example, base station 205 may transmit (and UE 210 may receive) the resource grant (e.g., a DCI message) that schedules or otherwise identifies one or more resources for the downlink transmission. In some aspects, the downlink transmission may include one or more ZP reference signals for UE 210 to use for rate matching during the downlink transmission. For example, the resource grant may identify one of the ZP reference signal resource sets that will be used during the downlink transmission from the configured resource sets. Base station 205 may also transmit (and UE 210 may receive) a signal (e.g., a DCI message that is associated with an uplink transmission) that triggers transmission of an aperiodic reference signal during the downlink transmission. UE 210 may utilize the aperiodic reference signal for rate matching, provided that UE 210 supports search space sharing. For example, UE 210 may determine whether or not search space sharing is supported and, if so, rate match around the aperiodic reference signal during the downlink transmission. If UE 210 determines that it does not support search space sharing, UE 210 may refrain from performing rate matching around the aperiodic reference signal. UE 210 may still rate match around the ZP-CSI-RS during the downlink transmission.

In some aspects, UE 210 may determine that it does not support search space sharing, but that the search space at least partially overlaps, e.g., the search space may be associated with multiple CIFs where the downlink DCI (e.g., the downlink grant) and the uplink DCI (e.g., the signal triggering transmission of the aperiodic reference signal) are received on the resources of the same search space. For example, the downlink grant (e.g., downlink DCI) may be received on control channel elements (CCEs) (e.g., resources) that are associated with a first search space, whereas the signal triggering transmission of the aperiodic reference signal (e.g., the uplink DCI) may be received on CCEs that are associated with the first search space and a second search space. In this instance, the UE may perform rate matching around the aperiodic reference signal triggered by the uplink DCI during the downlink transmission based at least in part on the overlapping resources.

In some aspects, rate matching during the downlink transmission (e.g., PDSCH) due to A-CSI-RS triggering on an uplink DCI may happen for an advanced UE capability, e.g., only if UE 210 supports search space sharing with cross component carrier scheduling. Otherwise, UE 210 may follow the ZP rate matching indication for the ZP CSI-RS during the downlink transmission, and does not rate match around the A-CSI-RS explicitly. For CA, the search space for different carriers scheduled from one component carrier may be separately defined. However, if the DCI sizes are aligned, and UE 210 is capable of search space sharing, then the DCI for component carrier 1 could be sent in component carrier 2 search space, but distinguished by the CIF. If UE 210 is not capable of search space sharing, the DCI for different carriers will be sent in their associated search space. However, in the situation where the search space is wrapped around, the search spaces may still be overlapping. For a UE (such as UE 210) that is not capable of search space sharing, it is not required/expected to use the CSI-RS indication or may ignore the CSI-RS indication for the purpose of PDSCH rate-matching. One exception may be that the signal triggering transmission of the aperiodic reference signal comes in the same search space as the downlink grant, e.g., when the downlink DCI is received on CCEs that are associated with a first search space and the uplink DCI is received on CCEs that are associated with the first search space and a second search space.

In another example rule, rate matching around an aperiodic reference signal may occur only when the aperiodic reference signal is triggered far enough in advance of the downlink transmission. For example, base station 205 may transmit (and UE 210 may receive) the signal (e.g., uplink DCI or uplink grant) that triggers transmission of the aperiodic reference signal during the downlink transmission. UE 210 may determine whether the signal was received a defined time period before the downlink transmission occurs. For example, the defined time period may include, but is not limited to, receiving the signal triggering the aperiodic reference signal a certain number of symbols or slots before receiving a first symbol containing a resource grant for the downlink transmission (e.g., the downlink grant). As another example, the defined time period may include receiving the signal triggering transmission of the aperiodic reference signal a defined number of symbols or slots before a first symbol of the downlink transmission. In some aspects, base station 205 may configure UE 210 with the defined time period before hand (e.g., by transmitting a signal to UE 210 that identifies the defined time period). In another example, UE 210 may transmit an indication of its capability configuration, which then triggers base station 205 to transmit the signal identifying the defined time period. In some aspects, the capability configuration of UE 210 may be based on or otherwise associated with the numerology of a carrier carrying the signal triggering transmission of the aperiodic reference signal, the numerology of the carrier carrying a resource grant for the downlink transmission (e.g., the downlink grant), and/or a numerology of a carrier that actually carries the downlink transmission. Provided that UE 210 determines that the signal triggering transmission of the aperiodic reference signal was received during the defined time period before the downlink transmission occurs, UE 210 may perform rate matching around the aperiodic reference signal during the downlink transmission. If UE 210 determines that the signal triggering transmission of the aperiodic reference signal was not received during the defined time period, UE 210 may refrain from performing rate matching around the aperiodic reference signal, but still may perform rate matching around the ZP reference signal indicated in the downlink grant.

Thus, in some aspects UE 210 only rate matches around the A-CSI-RS resources on a PDSCH (e.g., the downlink transmission) when the signal triggering transmission of the aperiodic reference signals (e.g., in an uplink DCI) is received at least X slots/symbols before the downlink DCI of that PDSCH or the first symbol of that PDSCH. In some aspects, X may be fixed and equal to "1 slot," or some other number of slots or symbols. As discussed, X may be based on the UE 210 capability configuration.

In another example rule, rate matching around an aperiodic reference signal may occur only for the same component carrier being used to carry the signal triggering transmission of the aperiodic reference signal and the downlink grant. For example, base station 205 may transmit (and UE 210 may receive) a signal (e.g., an uplink grant or uplink DCI) that triggers transmission of an aperiodic reference signal on a component carrier during a downlink transmission. The base station 205 may transmit (and UE 210 may receive) a resource grant that allocates or otherwise identifies resources for the downlink transmission. In some aspects, the downlink transmission may use the same component carrier as the signal triggering transmission of the aperiodic reference signal. Based on the same component carrier being used, UE 210 may perform rate matching around the aperiodic reference signal during the downlink transmission.

Thus, the PDSCH (e.g., the downlink transmission) rate matching due to A-CSI-RS triggering on an uplink DCI happens when the downlink DCI (which schedules the PDSCH) and the uplink DCI (which triggers a A-CSI-RS) appear on the same component carrier. In some aspects, this may include no cross component carrier scheduling for the downlink transmission and/or no cross component carrier A-CSI-RS triggering. In some aspects, UE 210 may not be required or expected to decode any uplink DCI from a second component carrier in order to construct the correct rate matching pattern of a PDSCH whose downlink DCI appears on CC1.

In some aspects, there may be multiple grants that impact mapping for downlink transmission. For example, UE 210 may support transmissions with possibly different timelines, e.g., subframe based transmissions and/or slot or a mini slot based transmissions and/or shorten transmission time interval (sTTI) transmissions. Accordingly, a first set of grants, without further limitations, may impact the downlink transmission schedule by a second grant. For example, the first grant may be a downlink grant the carries or otherwise conveys an indication of ZP-CSI-RS information whereas the second grant may be an uplink grant scheduling the aperiodic reference signals. In another example, there could be multiple grants with the same timeline, but the first grant triggers a reference signal that may fall within the downlink transmission scheduled by the second grant. In this situation, the PDSCH scheduled by one DCI may only follow the rate matching indication indicated by the same DCI. In some examples, the situation may occur when the second grant is sent in response to an urgent situation (e.g., ultra-reliable/low-latency communications (URLLC) occurring). In this case, base station 205 may by itself send the PDSCH and interrupt the CSI-RS transmission. As base station 205 is aware of this situation and knows which CSI reports are impacted, base station 205 may choose to use or drop the corresponding CSI report.

Accordingly, base station 205 may transmit (and UE 210 may receive) a first resource grant for a first downlink transmission that also triggers transmission of a first reference signal during the first downlink transmission. The base station 205 may also transmit (and UE 210 may also receive) the second resource grant for a second downlink transmission, wherein the second resource grant is received subsequent to receiving the first resource grant. In some aspects, the first downlink transmission and the second downlink transmission may overlap, at least to some degree, in time and/or frequency. UE 210 may therefore refrain from performing rate matching around the first reference signal, at least during the portion of the first downlink transmission that overlaps with the second downlink transmission. However, UE 210 may perform rate matching around the aperiodic reference signal during the second downlink transmission.

In some aspects, some UEs may not be capable of transmitting two PUSCHs (granted separately) or receiving two PDSCHs (granted separately). For example, if a 1 ms subframe-based LTE is scheduled in subframe n (granted in n−4), and later, an sTTI is scheduled in the same subframe on the same component carrier, the UE can drop the 1 ms-PDSCH decoding, but decode the sTTI. Although the data channel is dropped, except the for the ZP rate-matching information which should not have any impact on the later PDSCH, the UE may still perform all other functions indicated by the grant. In the downlink, this may include, downlink transmit power control (TPC) included in the power control accumulation, update last new data indicator (NDI), process the downlink assignment indicator (DAI). In the uplink, this may include the UE processing an aperiodic sounding reference signal (A-SRS) that is sent. In some aspects, the TPC for the PUSCH may be considered.

Figure 3A:
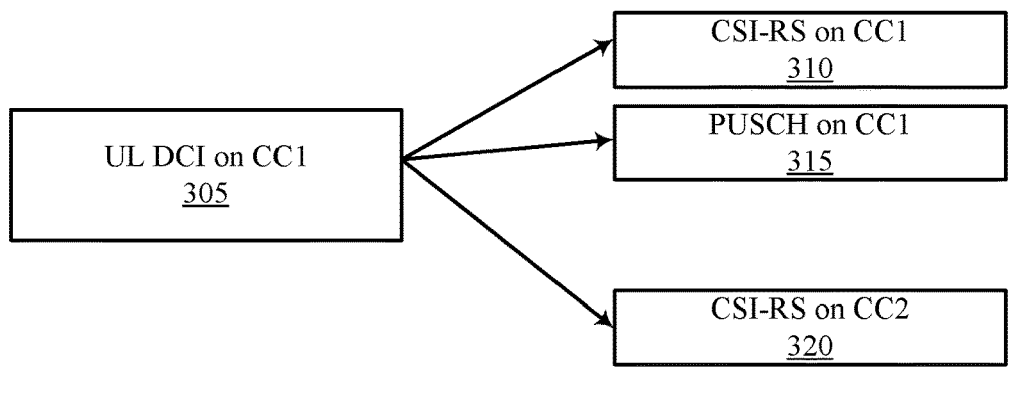
FIGS. 3A-3B illustrate examples of a reference signal configuration that supports A-CSI-RS rate matching rules in accordance with aspects of the present disclosure.
Figure 3B:
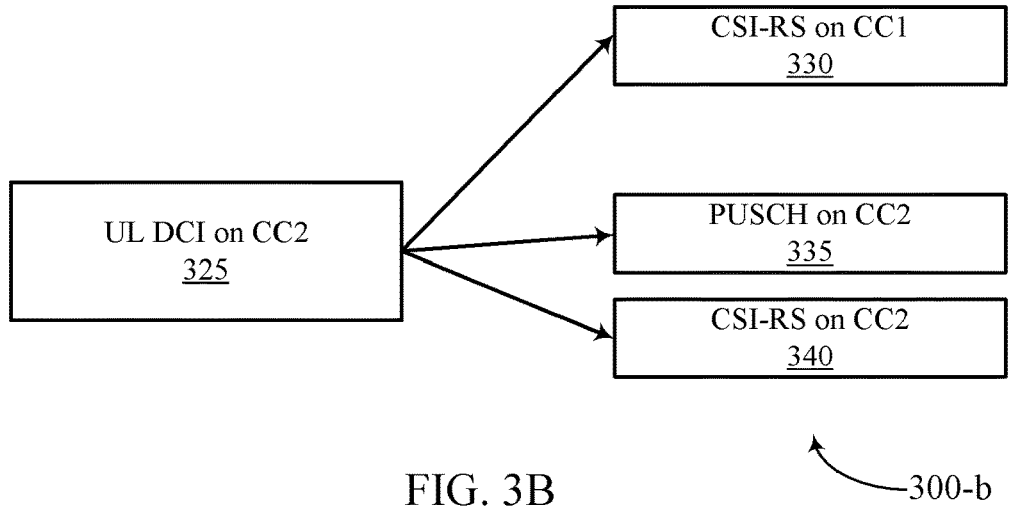
Figure 3C:
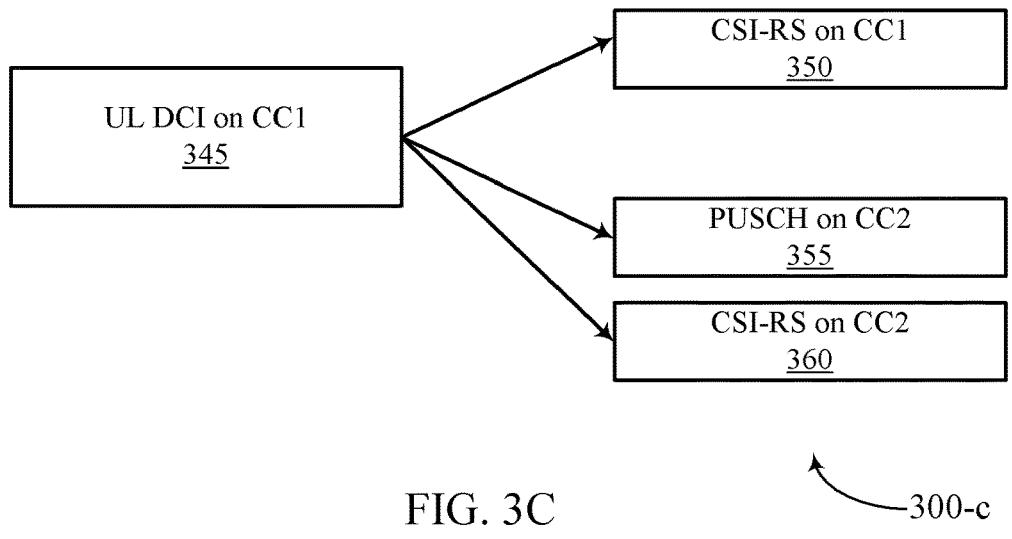

FIGS. 3A-3C illustrate examples of a reference signal configurations 300-a, 300-b, 300-c that support A-CSI-RS rate matching rules in accordance with aspects of the present disclosure. In some examples, reference signal configurations 300-a, 300-b, 300-c may implement aspects of wireless communication systems 100, 200. Aspects of reference signal configurations 300-a, 300-b, 300-c may be implemented by a base station and/or a UE, which may be examples of the corresponding devices described herein.

As is discussed above, conventional techniques may have potential timeline issues. For example, for non-ZP rate matching, a DCI on several component carriers may need to be considered before determining that PDSCH rate matching (and starting the demodulation). In some aspects, this may be associated with self-scheduled component carrier uplink grants, with cross component carrier triggered aperiodic reference signals, and the like. As one example, and referring first to reference signal configuration 300-a, an uplink DCI 305 on a first component carrier may schedule a CSI-RS 310 on the first component carrier, an uplink transmission 315 (e.g., PUSCH) on the first component carrier, and a CSI-RS 320 on a second component carrier. It should be understood that the uplink DCI 305 may include control information sent by a base station on CC1 for reception by one or more UEs. As another example, and referring to reference signal configuration 300-b, an uplink DCI 325 on a second component carrier may schedule a CSI-RS 330 on a first component carrier, an uplink transmission 335 on a second component carrier, and a CSI-RS 340 on the second component carrier. As yet another example, and referring to reference signal configuration 300-c, an uplink DCI 345 on a first component carrier may schedule a CSI-RS 350 on the first component carrier, an uplink transmission 355 on a second component carrier, and a CSI-RS 360 on the second component carrier. In some aspects, reference signal configurations 300-a, 300-b, 300-c illustrate an example of cross component carrier uplink grants and/or cross component carrier triggered aperiodic CSI. Generally, PDSCH rate matching for one component carrier cannot be performed before all grants are detected. However, aspects of the described techniques make rate matching independent of the CSI RS triggered by uplink grants, to a certain extent.

For example, the described rules for aperiodic reference signal rate matching may be based on the UE supporting search space sharing, based on the aperiodic reference signal being triggered far enough in advance of the downlink transmission, and/or when the same component carrier is used to grant the downlink transmission and trigger transmission of the aperiodic reference signal.

Figure 4:
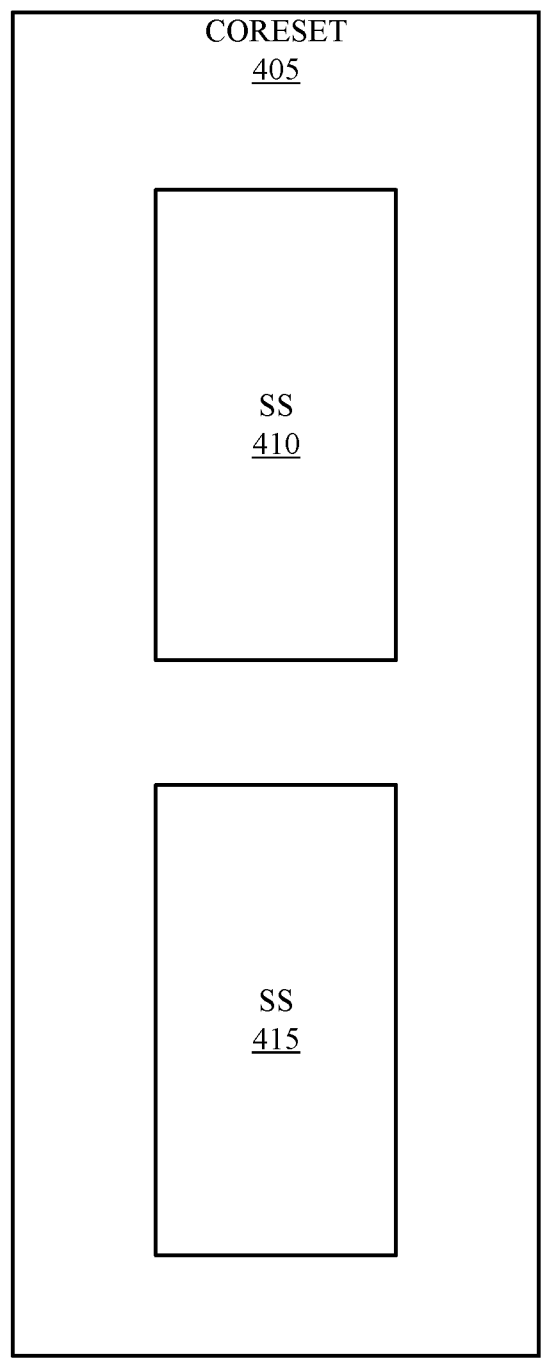
FIG. 4 illustrates an example of a search space configuration that supports A-CSI-RS rate matching rules in accordance with aspects of the present disclosure.

FIG. 4 illustrates an example of a search space configuration 400 that supports A-CSI-RS rate matching rules in accordance with aspects of the present disclosure. In some examples, search space configuration 400 may implement aspects of wireless communication systems 100/200 and/or reference signal configuration 300. Aspects of search space configuration 400 may be implemented by a UE and/or a base station, which may be examples of the corresponding devices described herein.

Generally, search space configuration 400 may include a corset 405 that spans at least two search spaces, e.g., search space 410 associated with a first component carrier and the search space 415 associated with a second component carrier. Generally, search space configuration 400 may be implemented in a carrier aggregation scenario where the search spaces for different carriers scheduled from one component carrier are separately defined. However, if the DCI sizes are aligned and the UE is capable of search space sharing, the DCI for the first component carrier could be sent in the second component carrier, but distinguished by the CIF.

That is, each of search spaces 410 and 415 may be defined separately for one component carrier. Thus in this regard, search spaces 410 and 415 can be considered overlapping, at least in some aspects. Accordingly, the UE may receive a DCI for a first component carrier in search space 410, which is for search space 415 in the second component carrier. However, the DCI received in the first component carrier and search space 410 may have a CIF field configured to indicate that the DCI is for the second search space 415 and associated component carriers. Accordingly, search space configuration 400 illustrates one example of search space sharing where one component carrier can be scheduled in the second component carrier, or vice versa.

Figure 5:
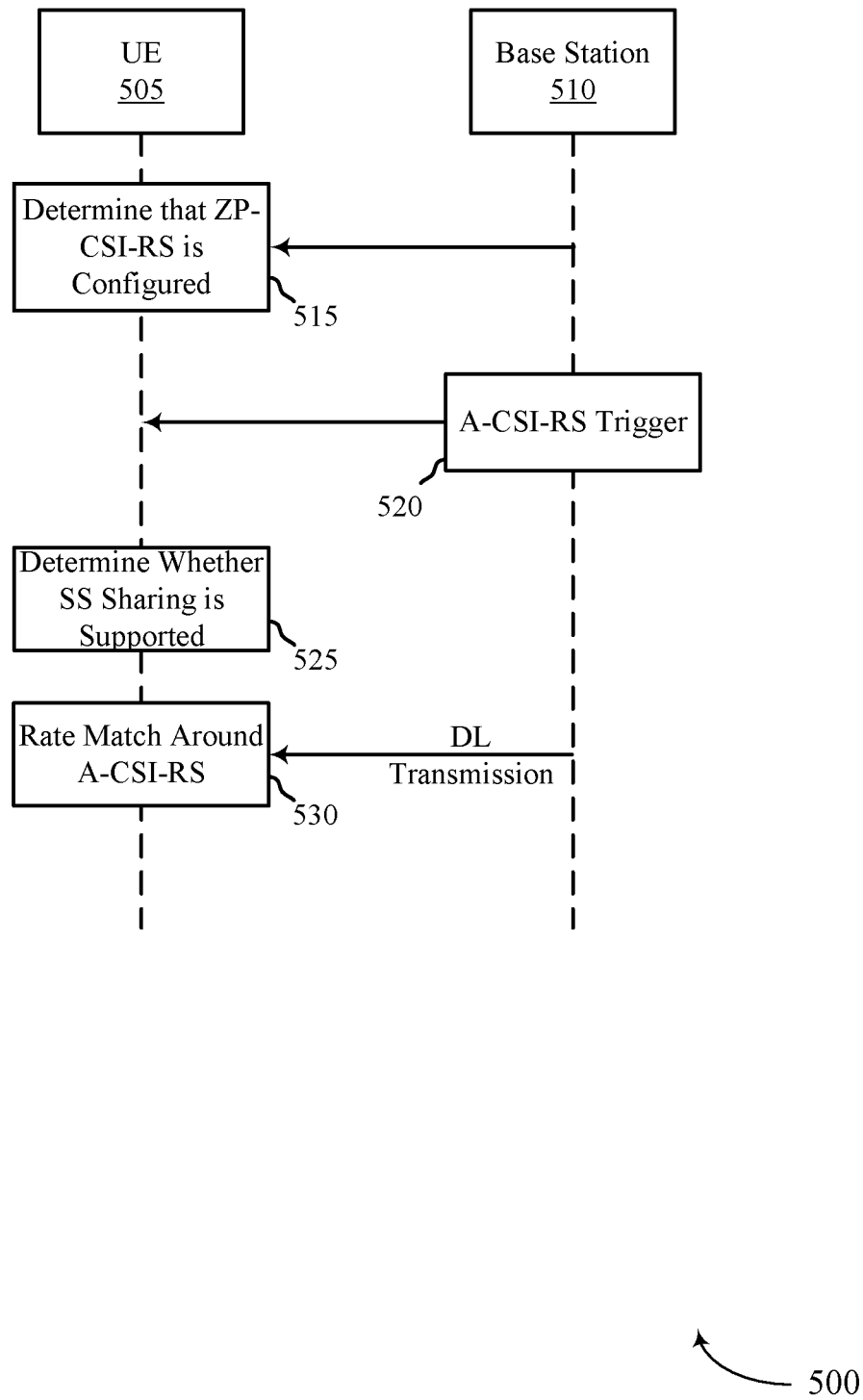
FIG. 5 illustrates an example of a process that supports A-CSI-RS rate matching rules in accordance with aspects of the present disclosure.

FIG. 5 illustrates an example of a process 500 that supports A-CSI-RS rate matching rules in accordance with aspects of the present disclosure. In some examples, process 500 may implement aspects of wireless communication systems 100/200, reference signal configuration 300, and/or search space configuration 400. Aspects of process 500 may be implemented by a UE 505 and/or a base station 510, which may be examples of the corresponding devices described herein.

At 515, base station 510 may transmit (and UE 505 may receive) a DCI message scheduling a downlink transmission that comprises the ZP reference signal for UE 505 to use for rate matching during the downlink transmission. In some aspects, the DCI message may be a control signal (e.g., PDCCH) communicated in a search space configured for UE 505.

At 520, base station 510 may transmit (and UE 505 may receive) a signal triggering transmission of an aperiodic reference signal during the downlink transmission. In some aspects, the signal may include a DCI message associated with an uplink transmission (e.g., an uplink DCI).

At 525, UE 505 may determine whether search space sharing is supported. For example, UE 505 may determine whether it supports cross component carrier scheduling, cross component carrier scheduling of CSI-RS, and the like.

Upon determining that UE 505 supports search space sharing, at 530 UE 505 may perform rate matching around the aperiodic reference signal during the downlink transmission. Upon determining that UE 505 does not support search space sharing, UE 505 may refrain from performing rate matching around the aperiodic reference signal during the downlink transmission. UE 5505 may perform rate matching around the ZP-CSI-RS during the downlink transmission.

In some aspects, this may include UE 505 determining that it does not support search space sharing, but determining that aspects of the signal triggering transmission of the aperiodic reference signal was received on resources (e.g., CCEs) that at least partially overlap with resources for the downlink control information message. In this instance, UE 505 may perform rate matching around the aperiodic reference signal.

Figure 6:
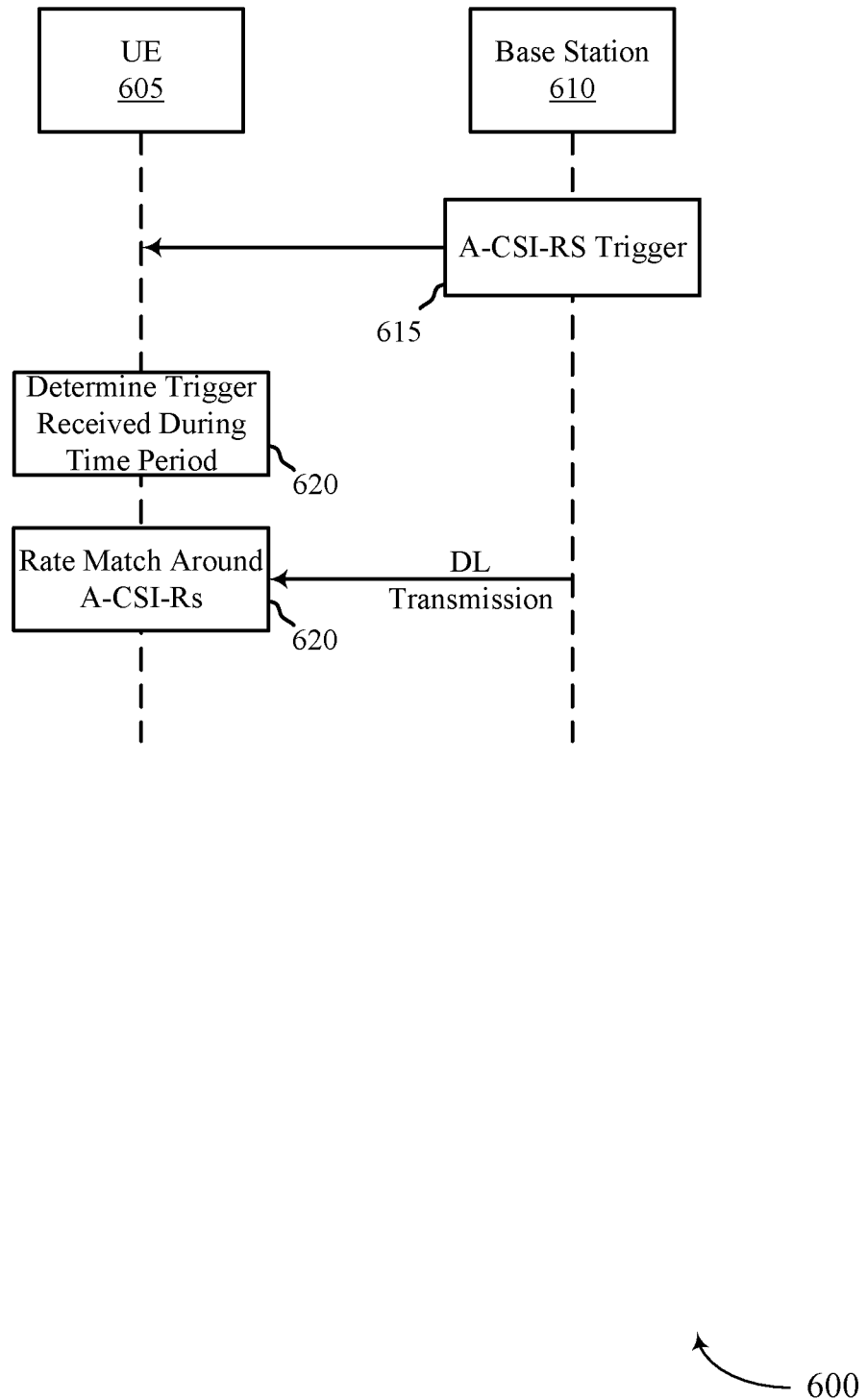
FIG. 6 illustrates an example of a process that supports A-CSI-RS rate matching rules in accordance with aspects of the present disclosure.

FIG. 6 illustrates an example of a process 600 that supports A-CSI-RS rate matching rules in accordance with aspects of the present disclosure. In some examples, process 600 may implement aspects of wireless communication systems 100/200, reference signal configuration 300, and/or search space configuration 400. Aspects of process 600 may be implemented by a UE 605 and/or a base station 610, which may be examples of the corresponding devices described herein.

At 615, base station 610 may transmit (and UE 605 may receive) a signal triggering transmission of an aperiodic reference signal during the downlink transmission. In some aspects, the signal may include a DCI message associated with an uplink transmission (e.g., an uplink DCI).

At 620, UE 605 may determine whether the signal triggering transmission of the aperiodic reference signal was received during a defined time period before the downlink transmission occurs. In some aspects, the defined time period may identify or otherwise be associated with a defined number of symbols or slots before receiving a first symbol containing the resource grant for the downlink transmission. In some aspects, the defined time period may identify or otherwise be associated with a defined number of symbols or slots before a first symbol of the downlink transmission occurs.

In some aspects, the defined time period may be based on the capability configuration of UE 605. For example, UE 605 may transmit (and base station 610 may receive) an indication of a capability configuration for UE 605. Base station 610 may receive the capability configuration and select the defined time period for UE 605, e.g., based on the capabilities of UE 605. Accordingly, base station 610 may transmit (and UE 605 may receive) a signal identifying the time period.

In some aspects, the defined time period may be based on one or more of the numerologies of a carrier carrying the signal triggering transmission of the aperiodic reference signal, of the carrier carrying a resource grant for the downlink transmission and/or the carrier carrying the downlink transmission.

Upon determining that the signal was received during the defined time period, at 620, UE 605 may perform rate matching around the aperiodic reference signal during the downlink transmission. Upon determining that the signal was not received during the defined time period, UE 605 may perform rate matching around the ZP reference signal during the downlink transmission, but not the aperiodic reference signal.

Figure 7:
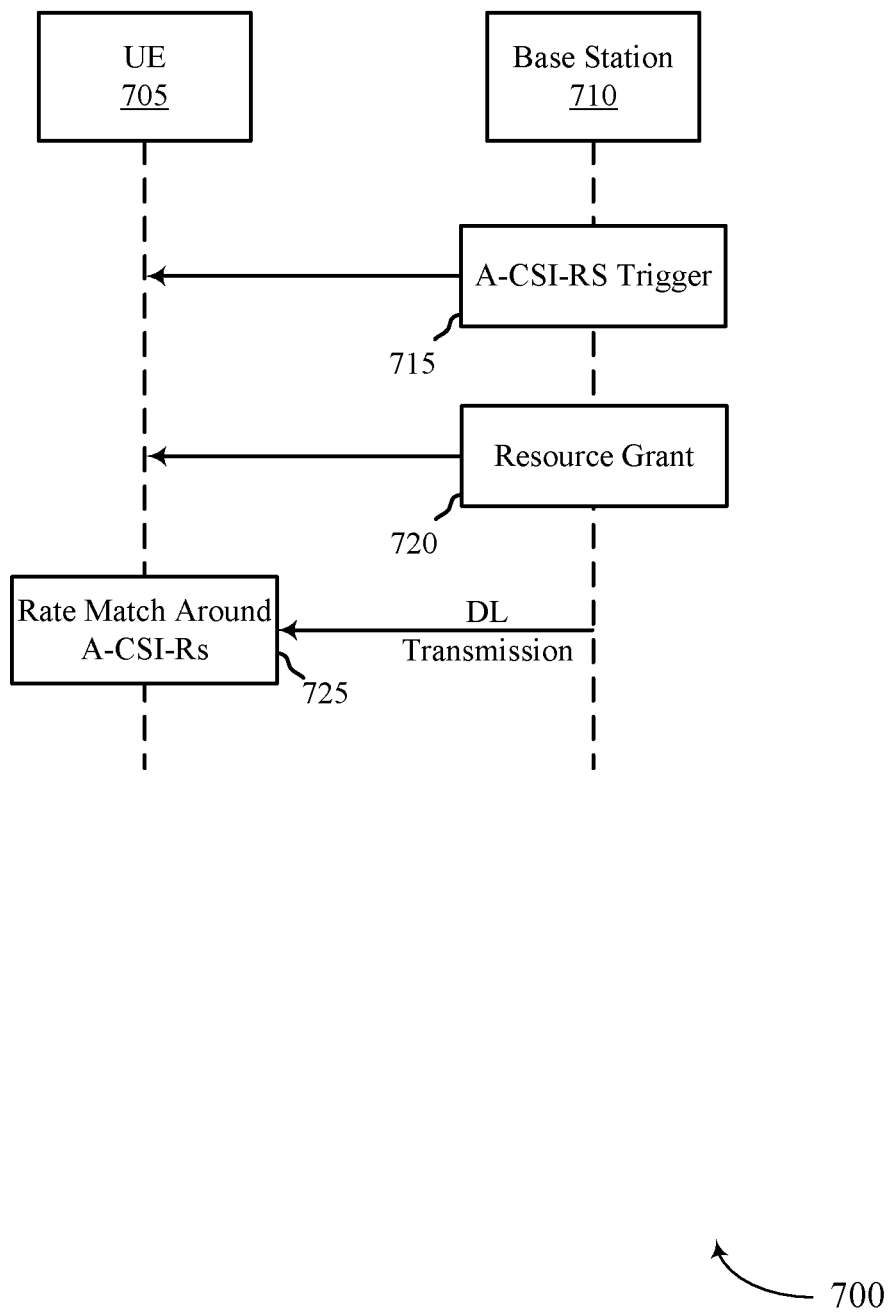
FIG. 7 illustrates an example of a process that supports A-CSI-RS rate matching rules in accordance with aspects of the present disclosure.

FIG. 7 illustrates an example of a process 700 that supports A-CSI-RS rate matching rules in accordance with aspects of the present disclosure. In some examples, process 700 may implement aspects of wireless communication systems 100/200, reference signal configuration 300, and/or search space configuration 400. Aspects of process 700 may be implemented by a UE 705 and/or a base station 710, which may be examples of the corresponding devices described herein.

At 715, base stations 10 may transmit (and UE 705 may receive) the signal triggering transmission of an aperiodic reference signal on a component carrier during a downlink transmission.

At 720, base station 710 may transmit (and UE 705 may receive) a resource grant allocating resources for the downlink transmission. In some aspects, the resource grant may carry or otherwise provide an indication that the downlink transmission uses the same component carrier. In some aspects, the resource grant may not trigger cross component carrier transmission of the downlink transmission. In some aspects, the signal triggering transmission of the aperiodic reference signal may not trigger cross component carrier transmission of the aperiodic reference signal.

At 725, UE 705 may perform rate matching around the aperiodic reference signal during the downlink transmission.

Figure 8:
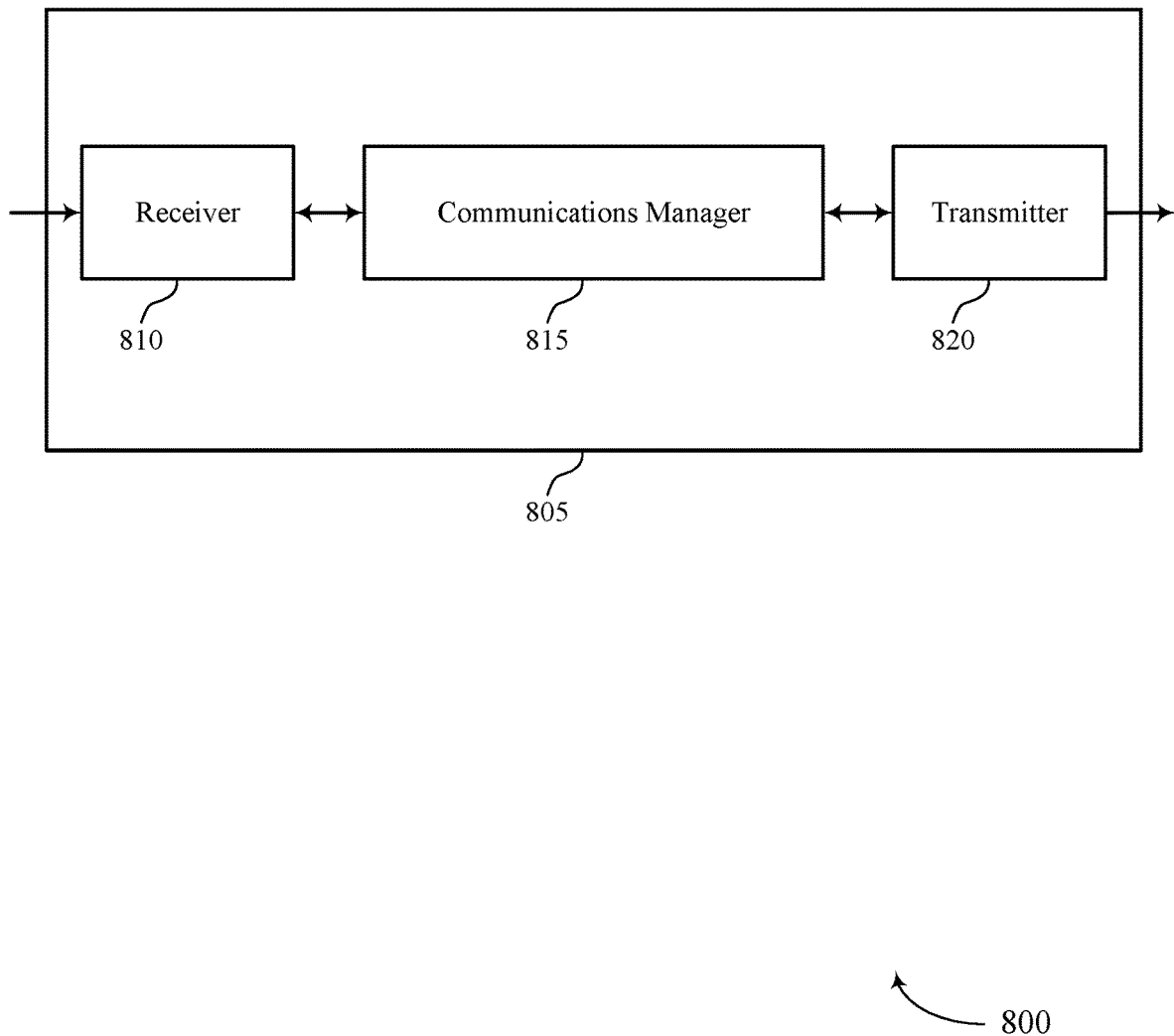
FIGS. 8 and 9 show block diagrams of devices that support A-CSI-RS rate matching rules in accordance with aspects of the present disclosure.

FIG. 8 shows a block diagram 800 of a device 805 that supports A-CSI-RS rate matching rules in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to A-CSI-RS rate matching rules, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a downlink control information message scheduling a downlink transmission that includes a zero-power reference signal for the UE to use for rate matching during the downlink transmission, receive a signal triggering transmission of an aperiodic reference signal during the downlink transmission, determine whether the UE supports search space sharing, and perform, upon determining that the UE supports search space sharing, rate matching around the aperiodic reference signal. The communications manager 815 may also receive, from a base station, a signal triggering transmission of an aperiodic reference signal during a downlink transmission from the base station, where the signal triggering transmission of the aperiodic reference signal includes a downlink control information message associated with an uplink grant, determine that the signal was received during a defined time period before the downlink transmission occurs, and perform, based on the determining, rate matching around the aperiodic reference signal during the downlink transmission. The communications manager 815 may also receive, from a base station, a signal triggering transmission of an aperiodic reference signal on a component carrier during a downlink transmission from the base station, receive, from the base station, a resource grant allocating resources for the downlink transmission, where the resource grant indicates the downlink transmission uses the component carrier, and perform, based on the aperiodic reference signal and the resource grant, rate matching around the aperiodic reference signal during the downlink transmission. The communications manager 815 may also receive, from a base station, a first resource grant for a first downlink transmission from the base station during a first time period, the first resource grant triggering transmission of a first reference signal during the first downlink transmission, receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission, refrain from performing rate matching around the first reference signal during a portion of the first time period for the first downlink transmission that overlaps with the second time period for the second downlink transmission, and perform rate matching around the aperiodic reference signal during the second downlink transmission. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
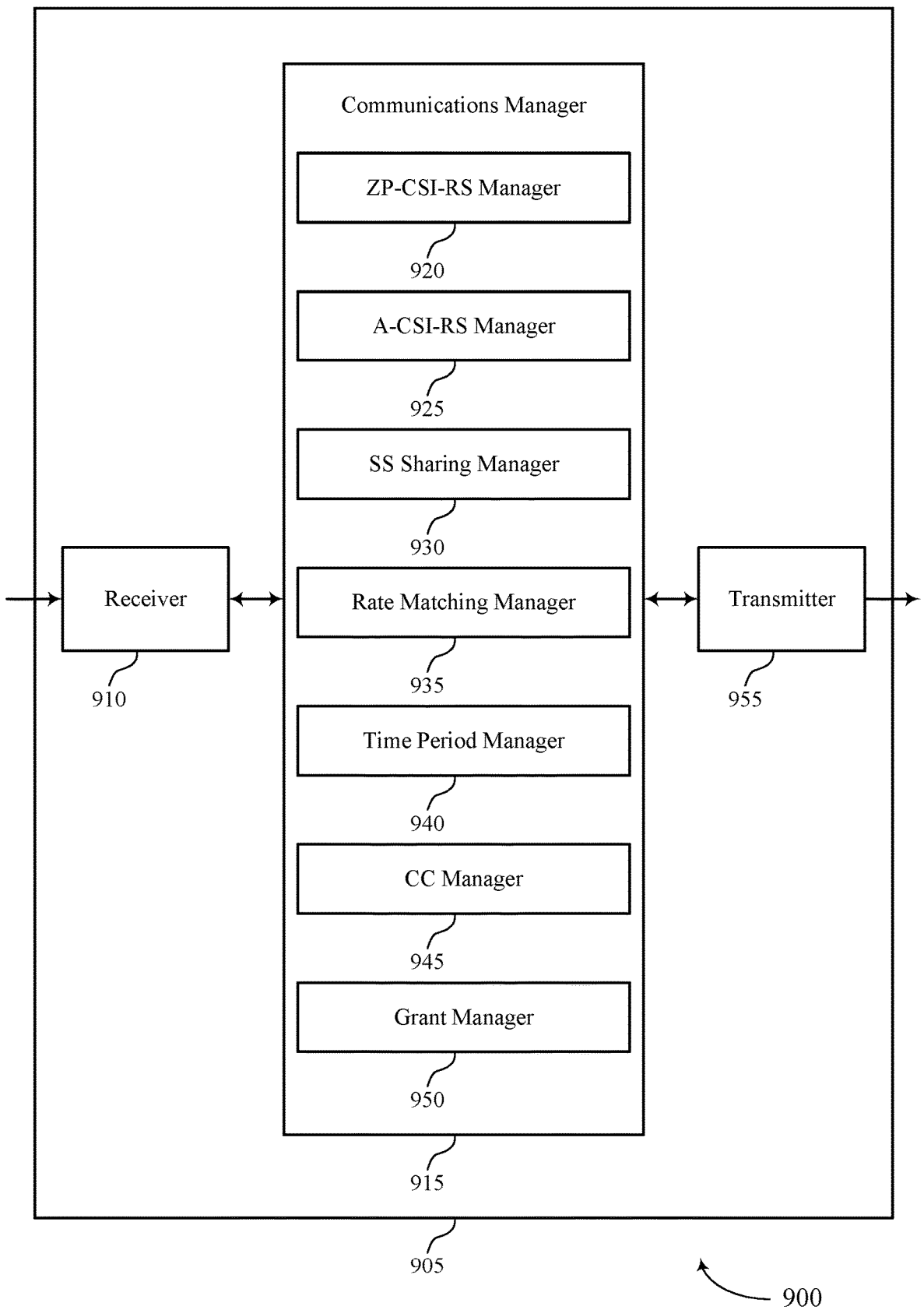

FIG. 9 shows a block diagram 900 of a device 905 that supports A-CSI-RS rate matching rules in accordance with aspects of the present disclosure. The device 905 may be an example of aspects of a device 805 or a UE 115 as described herein. The device 905 may include a receiver 910, a communications manager 915, and a transmitter 955. The device 905 may also include a processor. Each of these components may be in communication with one another (e.g., via one or more buses).

The receiver 910 may receive information such as packets, user data, or control information associated with various information channels (e.g., control channels, data channels, and information related to A-CSI-RS rate matching rules, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a ZP-CSI-RS manager 920, an A-CSI-RS manager 925, a SS sharing manager 930, a rate matching manager 935, a time period manager 940, a CC manager 945, and a grant manager 950. The communications manager 915 may be an example of aspects of the communications manager 1110 described herein.

The ZP-CSI-RS manager 920 may receive a downlink control information message scheduling a downlink transmission that includes a zero-power reference signal for the UE to use for rate matching during the downlink transmission.

The A-CSI-RS manager 925 may receive a signal triggering transmission of an aperiodic reference signal during the downlink transmission.

The SS sharing manager 930 may determine whether the UE supports search space sharing.

The rate matching manager 935 may perform, upon determining that the UE supports search space sharing, rate matching around the aperiodic reference signal.

The A-CSI-RS manager 925 may receive, from a base station, a signal triggering transmission of an aperiodic reference signal during a downlink transmission from the base station, where the signal triggering transmission of the aperiodic reference signal includes a downlink control information message associated with an uplink grant.

The time period manager 940 may determine that the signal was received during a defined time period before the downlink transmission occurs.

The rate matching manager 935 may perform, based on the determining, rate matching around the aperiodic reference signal during the downlink transmission.

The A-CSI-RS manager 925 may receive, from a base station, a signal triggering transmission of an aperiodic reference signal on a component carrier during a downlink transmission from the base station.

The CC manager 945 may receive, from the base station, a resource grant allocating resources for the downlink transmission, where the resource grant indicates the downlink transmission uses the component carrier.

The rate matching manager 935 may perform, based on the aperiodic reference signal and the resource grant, rate matching around the aperiodic reference signal during the downlink transmission.

The grant manager 950 may receive, from a base station, a first resource grant for a first downlink transmission from the base station during a first time period, the first resource grant triggering transmission of a first reference signal during the first downlink transmission and receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission.

The rate matching manager 935 may refrain from performing rate matching around the first reference signal during a portion of the first time period for the first downlink transmission that overlaps with the second time period for the second downlink transmission and perform rate matching around the aperiodic reference signal during the second downlink transmission.

The transmitter 955 may transmit signals generated by other components of the device 905. In some examples, the transmitter 955 may be collocated with a receiver 910 in a transceiver module. For example, the transmitter 955 may be an example of aspects of the transceiver 1120 described with reference to FIG. 11. The transmitter 955 may utilize a single antenna or a set of antennas.

Figure 10:
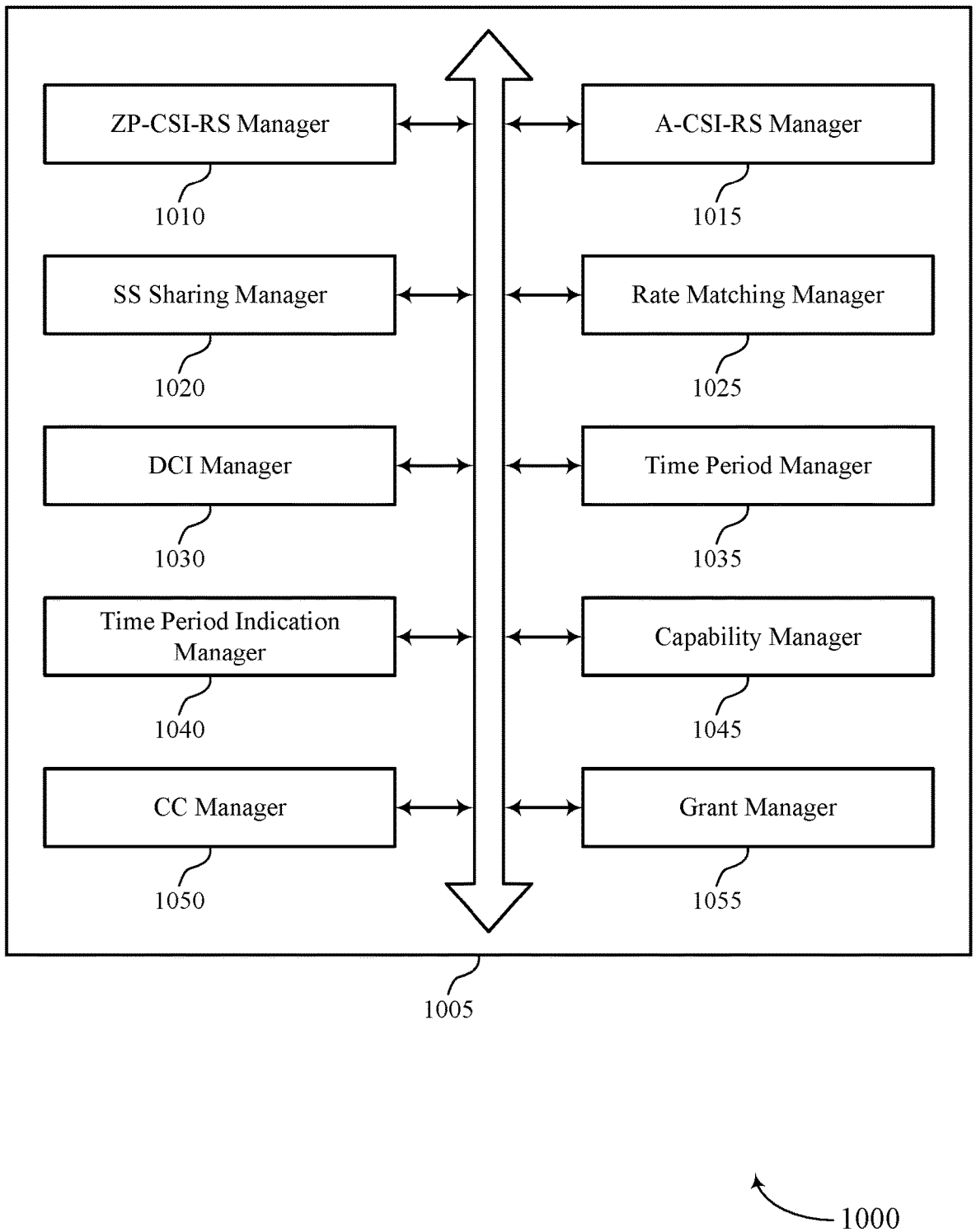
FIG. 10 shows a block diagram of a communications manager that supports A-CSI-RS rate matching rules in accordance with aspects of the present disclosure.

FIG. 10 shows a block diagram 1000 of a communications manager 1005 that supports A-CSI-RS rate matching rules in accordance with aspects of the present disclosure. The communications manager 1005 may be an example of aspects of a communications manager 815, a communications manager 915, or a communications manager 1110 described herein. The communications manager 1005 may include a ZP-CSI-RS manager 1010, an A-CSI-RS manager 1015, a SS sharing manager 1020, a rate matching manager 1025, a DCI manager 1030, a time period manager 1035, a time period indication manager 1040, a capability manager 1045, a CC manager 1050, and a grant manager 1055. Each of these modules may communicate, directly or indirectly, with one another (e.g., via one or more buses).

The ZP-CSI-RS manager 1010 may receive a downlink control information message scheduling a downlink transmission that includes a zero-power reference signal for the UE to use for rate matching during the downlink transmission.

The A-CSI-RS manager 1015 may receive a signal triggering transmission of an aperiodic reference signal during the downlink transmission.

In some examples, receiving, from a base station, a signal triggering transmission of an aperiodic reference signal during a downlink transmission from the base station, where the signal triggering transmission of the aperiodic reference signal includes a downlink control information message associated with an uplink grant.

In some examples, the A-CSI-RS manager 1015 may receive, from a base station, a signal triggering transmission of an aperiodic reference signal on a component carrier during a downlink transmission from the base station. In some cases, the signal triggering transmission of the aperiodic reference signal includes a downlink control information message associated with an uplink transmission. In some cases, the signal triggering transmission of the aperiodic reference signal does not trigger cross-component carrier transmission of the aperiodic reference signal. In some cases, the signal triggering transmission of the aperiodic reference signal includes a downlink control information message associated with an uplink transmission.

The SS sharing manager 1020 may determine whether the UE supports search space sharing.

In some examples, the SS sharing manager 1020 may determine that the UE does not support search space sharing.

In some examples, the SS sharing manager 1020 may determine that the signal triggering transmission of the aperiodic reference signal was received on resources that at least partially overlap with resources for the downlink control information message.

In some examples, the SS sharing manager 1020 may perform, based on the at least partially overlapping resources, rate matching around the aperiodic reference signal.

The rate matching manager 1025 may perform, upon determining that the UE supports search space sharing, rate matching around the aperiodic reference signal.

In some examples, the rate matching manager 1025 may perform, based on the determining, rate matching around the aperiodic reference signal during the downlink transmission.

In some examples, the rate matching manager 1025 may perform, based on the aperiodic reference signal and the resource grant, rate matching around the aperiodic reference signal during the downlink transmission.

In some examples, the rate matching manager 1025 may refrain from performing rate matching around the first reference signal during a portion of the first time period for the first downlink transmission that overlaps with the second time period for the second downlink transmission.

In some examples, the rate matching manager 1025 may perform rate matching around the aperiodic reference signal during the second downlink transmission.

The time period manager 1035 may determine that the signal was received during a defined time period before the downlink transmission occurs. In some cases, the defined time period includes receiving the signal a defined number of symbols or slots before receiving a first symbol containing a resource grant for the downlink transmission. In some cases, the defined time period includes receiving the signal a defined number of symbols or slots before a first symbol of the downlink transmission occurs.

The CC manager 1050 may receive, from the base station, a resource grant allocating resources for the downlink transmission, where the resource grant indicates the downlink transmission uses the component carrier. In some cases, the resource grant does not trigger cross-component carrier transmission of the downlink transmission.

The grant manager 1055 may receive, from a base station, a first resource grant for a first downlink transmission from the base station during a first time period, the first resource grant triggering transmission of a first reference signal during the first downlink transmission.

In some examples, the grant manager 1055 may receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission.

The DCI manager 1030 may refrain from performing, upon determining that the UE does not support search space sharing, rate matching around the aperiodic reference signal.

The time period indication manager 1040 may receive a signal identifying the defined time period.

The capability manager 1045 may transmit an indication of a capability configuration to the base station. In some examples, the capability manager 1045 may receive a signal identifying the defined time period, where the defined time period is based on the capability configuration. In some cases, the capability configuration is based on one or more of a numerology of a carrier carrying the signal triggering transmission of the aperiodic reference signal, a numerology of a carrier carrying a resource grant for the downlink transmission, a numerology of a carrier carrying the downlink transmission, or a combination thereof.

Figure 11:
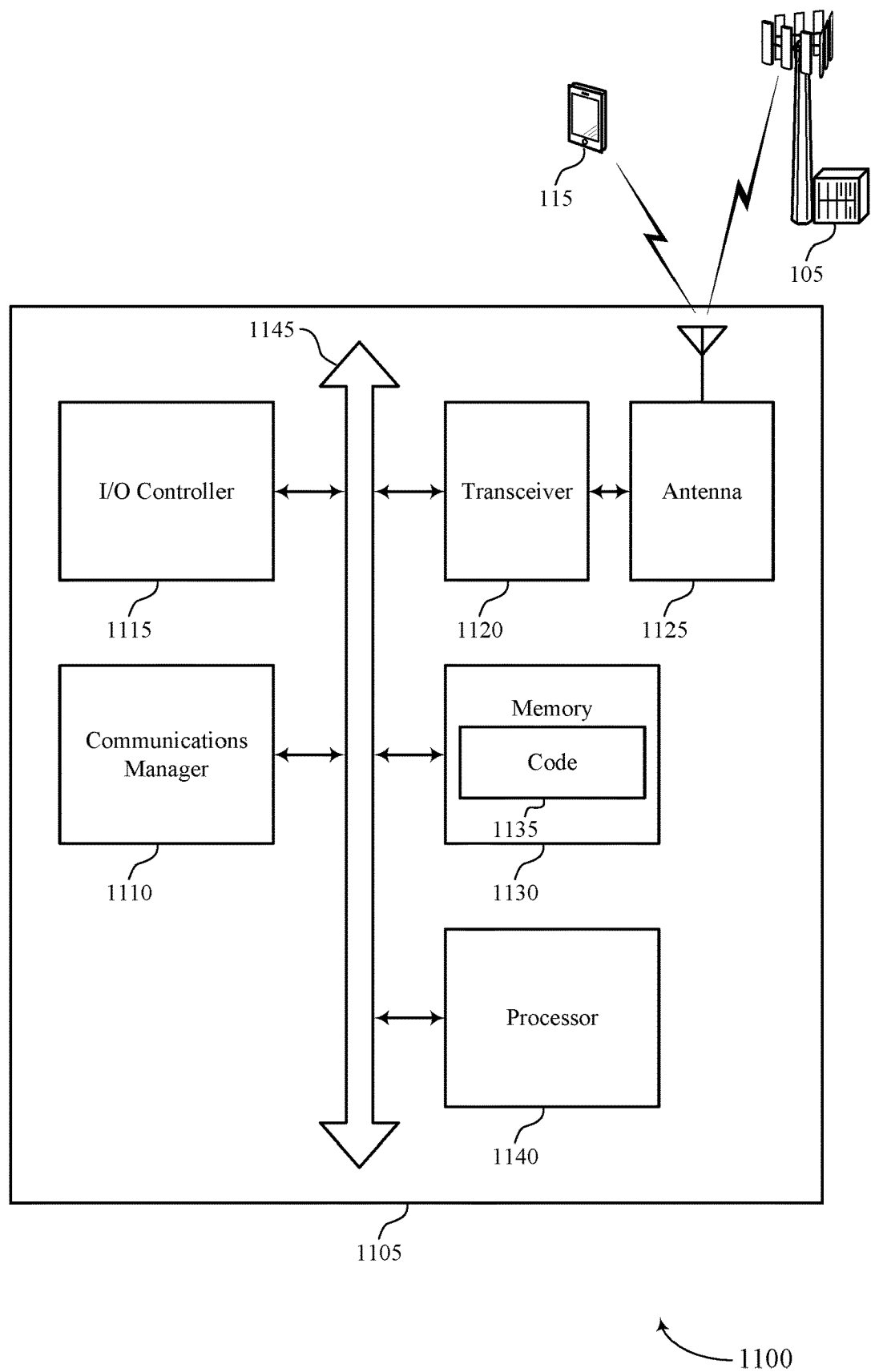
FIG. 11 shows a diagram of a system including a device that supports A-CSI-RS rate matching rules in accordance with aspects of the present disclosure.

FIG. 11 shows a diagram of a system 1100 including a device 1105 that supports A-CSI-RS rate matching rules in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a I/O controller 1115, a transceiver 1120, an antenna 1125, memory 1130, and a processor 1140. These components may be in electronic communication via one or more buses (e.g., bus 1145).

The communications manager 1110 may receive a downlink control information message scheduling a downlink transmission that includes a zero-power reference signal for the UE to use for rate matching during the downlink transmission, receive a signal triggering transmission of an aperiodic reference signal during the downlink transmission, determine whether the UE supports search space sharing, and perform, upon determining that the UE supports search space sharing, rate matching around the aperiodic reference signal. The communications manager 1110 may also receive, from a base station, a signal triggering transmission of an aperiodic reference signal during a downlink transmission from the base station, where the signal triggering transmission of the aperiodic reference signal includes a downlink control information message associated with an uplink grant, determine that the signal was received during a defined time period before the downlink transmission occurs, and perform, based on the determining, rate matching around the aperiodic reference signal during the downlink transmission. The communications manager 1110 may also receive, from a base station, a signal triggering transmission of an aperiodic reference signal on a component carrier during a downlink transmission from the base station, receive, from the base station, a resource grant allocating resources for the downlink transmission, where the resource grant indicates the downlink transmission uses the component carrier, and perform, based on the aperiodic reference signal and the resource grant, rate matching around the aperiodic reference signal during the downlink transmission. The communications manager 1110 may also receive, from a base station, a first resource grant for a first downlink transmission from the base station during a first time period, the first resource grant triggering transmission of a first reference signal during the first downlink transmission, receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission, refrain from performing rate matching around the first reference signal during a portion of the first time period for the first downlink transmission that overlaps with the second time period for the second downlink transmission, and perform rate matching around the aperiodic reference signal during the second downlink transmission.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting A-CSI-RS rate matching rules).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
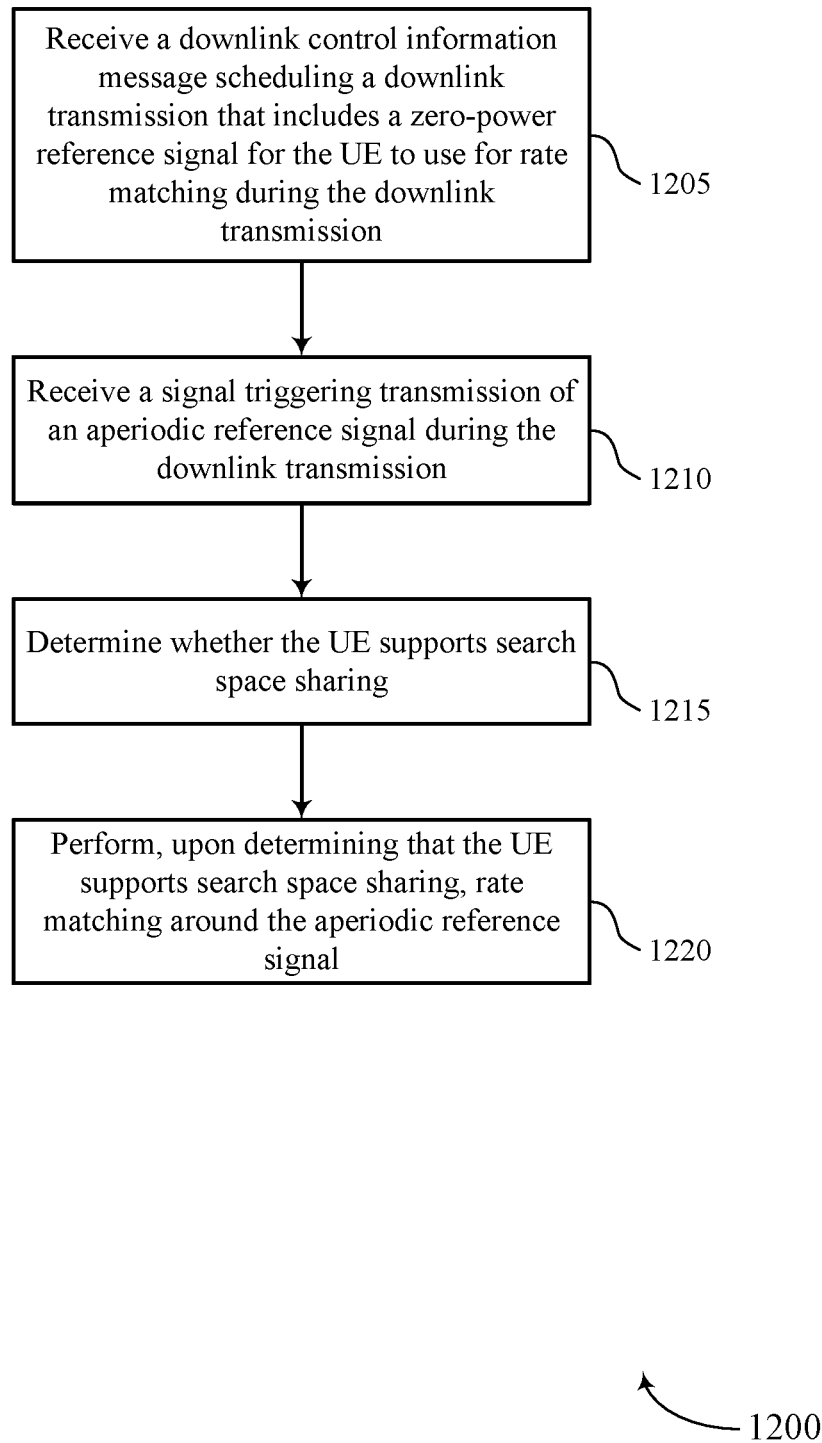
FIGS. 12 through 15 show flowcharts illustrating methods that support A-CSI-RS rate matching rules in accordance with aspects of the present disclosure.

FIG. 12 shows a flowchart illustrating a method 1200 that supports A-CSI-RS rate matching rules in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may receive a downlink control information message scheduling a downlink transmission that includes a zero-power reference signal for the UE to use for rate matching during the downlink transmission. The operations of 1205 may be performed according to the methods described herein. In some examples, aspects of the operations of 1205 may be performed by a ZP-CSI-RS manager as described with reference to FIGS. 8 through 11.

At 1210, the UE may receive a signal triggering transmission of an aperiodic reference signal during the downlink transmission. The operations of 1210 may be performed according to the methods described herein. In some examples, aspects of the operations of 1210 may be performed by an A-CSI-RS manager as described with reference to FIGS. 8 through 11.

At 1215, the UE may determine whether the UE supports search space sharing. The operations of 1215 may be performed according to the methods described herein. In some examples, aspects of the operations of 1215 may be performed by a SS sharing manager as described with reference to FIGS. 8 through 11.

At 1220, the UE may perform, upon determining that the UE supports search space sharing, rate matching around the aperiodic reference signal. The operations of 1220 may be performed according to the methods described herein. In some examples, aspects of the operations of 1220 may be performed by a rate matching manager as described with reference to FIGS. 8 through 11.

Figure 13:
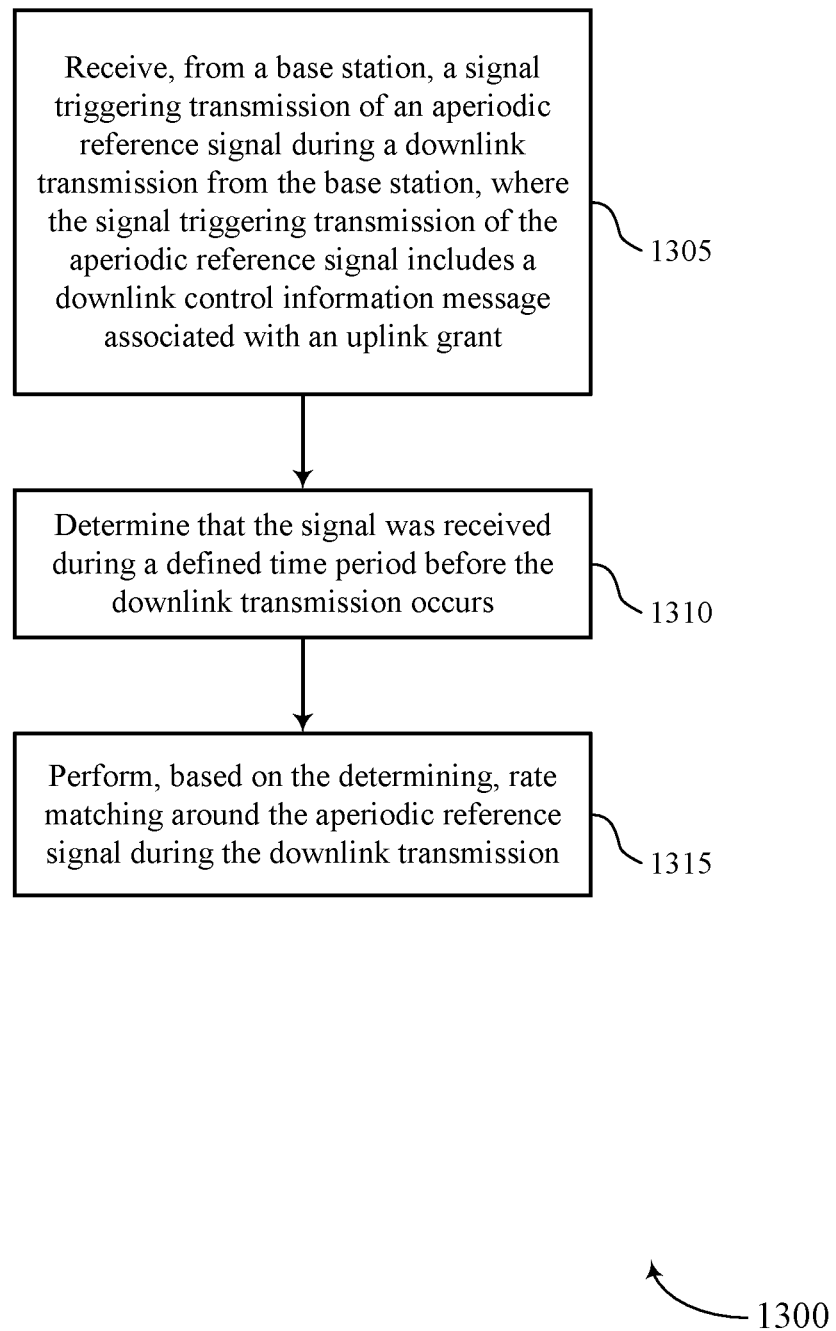

FIG. 13 shows a flowchart illustrating a method 1300 that supports A-CSI-RS rate matching rules in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a signal triggering transmission of an aperiodic reference signal during a downlink transmission from the base station, where the signal triggering transmission of the aperiodic reference signal includes a downlink control information message associated with an uplink grant. The operations of 1305 may be performed according to the methods described herein. In some examples, aspects of the operations of 1305 may be performed by an A-CSI-RS manager as described with reference to FIGS. 8 through 11.

At 1310, the UE may determine that the signal was received during a defined time period before the downlink transmission occurs. The operations of 1310 may be performed according to the methods described herein. In some examples, aspects of the operations of 1310 may be performed by a time period manager as described with reference to FIGS. 8 through 11.

At 1315, the UE may perform, based on the determining, rate matching around the aperiodic reference signal during the downlink transmission. The operations of 1315 may be performed according to the methods described herein. In some examples, aspects of the operations of 1315 may be performed by a rate matching manager as described with reference to FIGS. 8 through 11.

Figure 14:
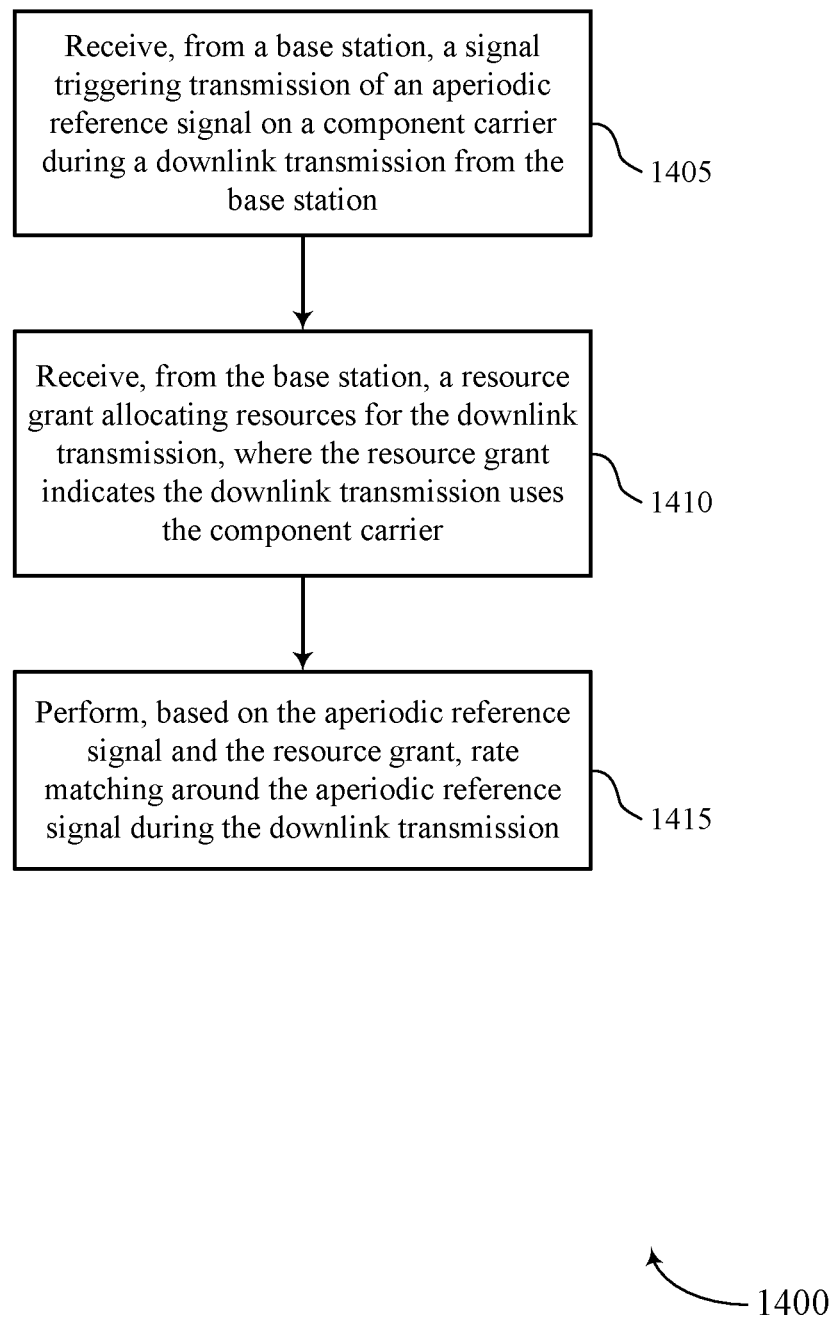

FIG. 14 shows a flowchart illustrating a method 1400 that supports A-CSI-RS rate matching rules in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a signal triggering transmission of an aperiodic reference signal on a component carrier during a downlink transmission from the base station. The operations of 1405 may be performed according to the methods described herein. In some examples, aspects of the operations of 1405 may be performed by an A-CSI-RS manager as described with reference to FIGS. 8 through 11.

At 1410, the UE may receive, from the base station, a resource grant allocating resources for the downlink transmission, where the resource grant indicates the downlink transmission uses the component carrier. The operations of 1410 may be performed according to the methods described herein. In some examples, aspects of the operations of 1410 may be performed by a CC manager as described with reference to FIGS. 8 through 11.

At 1415, the UE may perform, based on the aperiodic reference signal and the resource grant, rate matching around the aperiodic reference signal during the downlink transmission. The operations of 1415 may be performed according to the methods described herein. In some examples, aspects of the operations of 1415 may be performed by a rate matching manager as described with reference to FIGS. 8 through 11.

Figure 15:
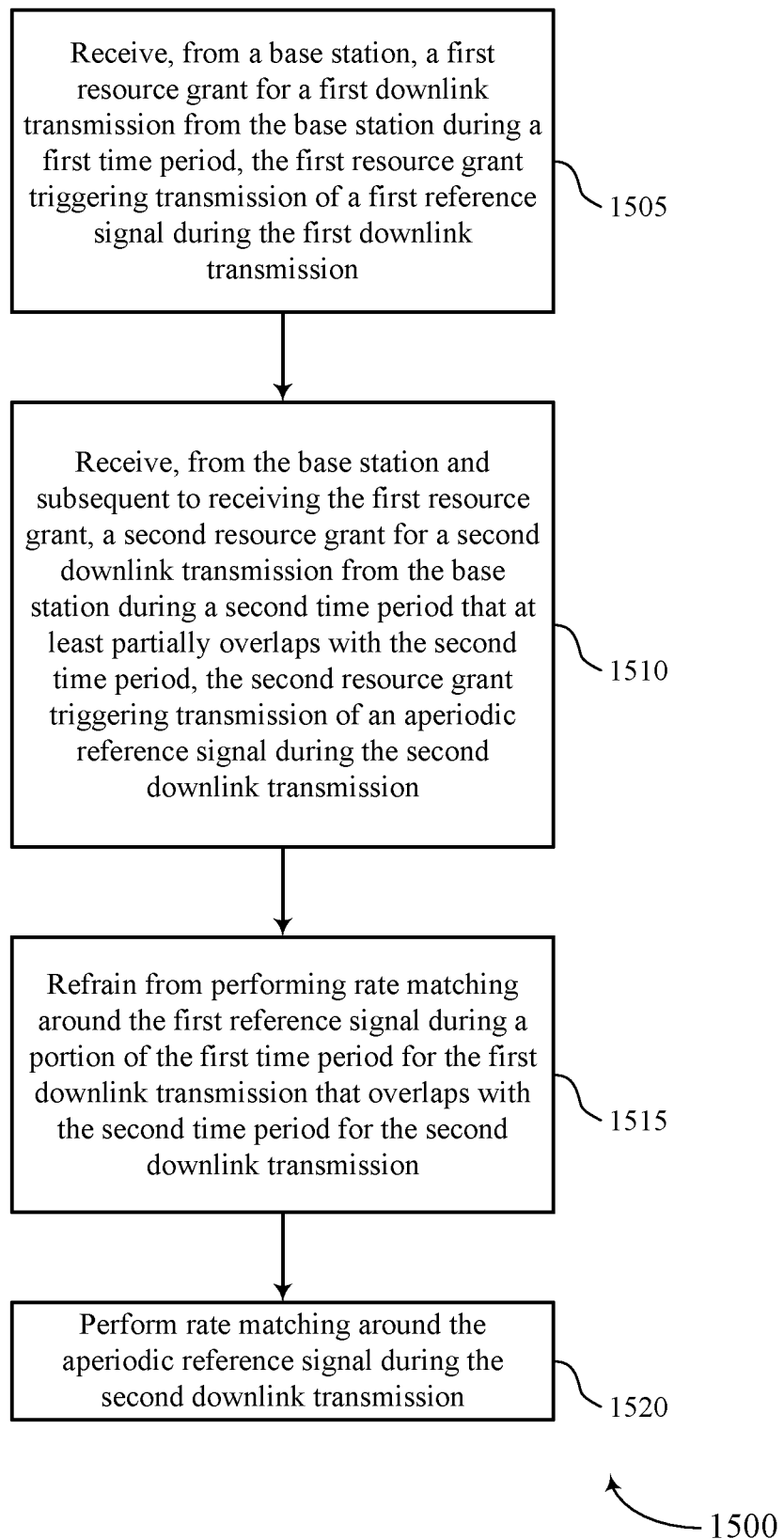

FIG. 15 shows a flowchart illustrating a method 1500 that supports A-CSI-RS rate matching rules in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a first resource grant for a first downlink transmission from the base station during a first time period, the first resource grant triggering transmission of a first reference signal during the first downlink transmission. The operations of 1505 may be performed according to the methods described herein. In some examples, aspects of the operations of 1505 may be performed by a grant manager as described with reference to FIGS. 8 through 11.

At 1510, the UE may receive, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission. The operations of 1510 may be performed according to the methods described herein. In some examples, aspects of the operations of 1510 may be performed by a grant manager as described with reference to FIGS. 8 through 11.

At 1515, the UE may refrain from performing rate matching around the first reference signal during a portion of the first time period for the first downlink transmission that overlaps with the second time period for the second downlink transmission. The operations of 1515 may be performed according to the methods described herein. In some examples, aspects of the operations of 1515 may be performed by a rate matching manager as described with reference to FIGS. 8 through 11.

At 1520, the UE may perform rate matching around the aperiodic reference signal during the second downlink transmission. The operations of 1520 may be performed according to the methods described herein. In some examples, aspects of the operations of 1520 may be performed by a rate matching manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein. Thus, example 1 is a method for wireless communication at a UE that includes: receiving a downlink control information message scheduling a downlink transmission that comprises a zero-power reference signal for the UE to use for rate matching during the downlink transmission; receiving a signal triggering transmission of an aperiodic reference signal during the downlink transmission; determining whether the UE supports search space sharing; and performing, upon determining that the UE supports search space sharing, rate matching around the aperiodic reference signal.

In example 2, the method of example 1 may include refraining from performing, upon determining that the UE does not support search space sharing, rate matching around the aperiodic reference signal.

In example 3, the method of examples 1-2 may include determining that the UE does not support search space sharing; determining that the signal triggering transmission of the aperiodic reference signal was received on resources that at least partially overlap with resources for the downlink control information message; and performing, based at least in part on the at least partially overlapping resources, rate matching around the aperiodic reference signal.

In example 4, the method of examples 1-3 may include the signal triggering transmission of the aperiodic reference signal comprises a downlink control information message associated with an uplink transmission.

Example 5 is a method for wireless communication at a UE that includes: receiving, from a base station, a signal triggering transmission of an aperiodic reference signal during a downlink transmission from the base station, wherein the signal triggering transmission of the aperiodic reference signal comprises a downlink control information message associated with an uplink grant; determining that the signal was received during a defined time period before the downlink transmission occurs; and performing, based at least in part on the determining, rate matching around the aperiodic reference signal during the downlink transmission.

In example 6, the method of example 5 may include the defined time period comprises receiving the signal a defined number of symbols or slots before receiving a first symbol containing a resource grant for the downlink transmission.

In example 7, the method of examples 5-6 may include the defined time period comprises receiving the signal a defined number of symbols or slots before a first symbol of the downlink transmission occurs.

In example 8, the method of examples 5-7 may include receiving a signal identifying the defined time period.

In example 9, the method of examples 5-8 may include: transmitting an indication of a capability configuration to the base station; and receiving a signal identifying the defined time period, wherein the defined time period is based at least in part on the capability configuration.

In example 10, the method of examples 5-9 may include the capability configuration is based at least in part on one or more of a numerology of a carrier carrying the signal triggering transmission of the aperiodic reference signal, a numerology of a carrier carrying a resource grant for the downlink transmission, a numerology of a carrier carrying the downlink transmission, or a combination thereof.

Example 11 is a method for wireless communication at a UE that includes: receiving, from a base station, a signal triggering transmission of an aperiodic reference signal on a component carrier during a downlink transmission from the base station; receiving, from the base station, a resource grant allocating resources for the downlink transmission, wherein the resource grant indicates the downlink transmission uses the component carrier; and performing, based at least in part on the aperiodic reference signal and the resource grant, rate matching around the aperiodic reference signal during the downlink transmission.

In example 12, the method of example 11 may include the signal triggering transmission of the aperiodic reference signal does not trigger cross-component carrier transmission of the aperiodic reference signal.

In example 13, the method of examples 11-12 may include the resource grant does not trigger cross-component carrier transmission of the downlink transmission.

In example 14, the method of examples 11-13 may include the signal triggering transmission of the aperiodic reference signal comprises a downlink control information message associated with an uplink transmission.

Example 15 is a method for wireless communication at a UE, that includes: receiving, from a base station, a first resource grant for a first downlink transmission from the base station during a first time period, the first resource grant triggering transmission of a first reference signal during the first downlink transmission; receiving, from the base station and subsequent to receiving the first resource grant, a second resource grant for a second downlink transmission from the base station during a second time period that at least partially overlaps with the second time period, the second resource grant triggering transmission of an aperiodic reference signal during the second downlink transmission; refraining from performing rate matching around the first reference signal during a portion of the first time period for the first downlink transmission that overlaps with the second time period for the second downlink transmission; and performing rate matching around the aperiodic reference signal during the second downlink transmission.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a downlink control information message scheduling a downlink transmission that comprises a zero-power reference signal for the UL to use for rate matching during the downlink transmission;
receiving a signal triggering transmission of an aperiodic reference signal during the downlink transmission;
determining whether the UE supports search space sharing;
performing, upon determining that the UE supports search space sharing, rate matching around the aperiodic reference signal; and
refraining from performing, upon determining that the UE does not support search space sharing, rate matching around the aperiodic reference signal.

2. The method of claim 1, wherein the signal triggering transmission of the aperiodic reference signal comprises a downlink control information message associated with an uplink transmission.

3. A method for wireless communication at a user equipment (UE), comprising:
receiving, from a base station, a signal triggering transmission of an aperiodic reference signal during a downlink transmission from the base station, wherein the signal triggering transmission of the aperiodic reference signal comprises a downlink control information message associated with an uplink grant;
determining that the signal was received during a defined time period before the downlink transmission occurs; and
performing, based at least in part on the determining, rate matching around the aperiodic reference signal during the downlink transmission;
wherein the defined time period comprises: (i) receiving the signal a defined number of symbols or slots before receiving a first symbol containing a resource grant for the downlink transmission or (ii) receiving the signal a defined number of symbols or slots before a first symbol of the downlink transmission occurs.

4. The method of claim 3, further comprising:
receiving a signal identifying the defined time period.

5. The method of claim 3, further comprising:
transmitting an indication of a capability configuration to the base station; and
receiving a signal identifying the defined time period, wherein the defined time period is based at least in part on the capability configuration.

6. The method of claim 5, wherein the capability configuration is based at least in part on one or more of a numerology of a carrier carrying the signal triggering transmission of the aperiodic reference signal, a numerology of a carrier carrying a resource grant, for the downlink transmission, a numerology of a carrier carrying the downlink transmission, or a combination thereof.

7. An apparatus for wireless communication at a user equipment (UE), comprising:
a processor,
memory in electronic communication with the processor; and
instructions stored in the memory and executable by the processor to cause the apparatus to:
receive a downlink control information message scheduling a downlink transmission that comprises a zero-power reference signal for the UE to use for rate matching during the downlink transmission;
receive a signal triggering transmission of an aperiodic reference signal during the downlink transmission;
determine whether the UE supports search space sharing;
determine that the signal triggering transmission of the aperiodic reference signal was received on resources that at least partially overlap with resources for the downlink control information message; and
perform, based at least in part on the at least partially overlapping resources and a determination that the UE does not support search space sharing, rate matching around the aperiodic reference signal.

8. The apparatus of claim 7, wherein the signal triggering transmission of the aperiodic reference signal comprises a downlink control information message associated with an uplink transmission.

9. An apparatus for wireless communication at a user equipment (UE), comprising:
means for receiving a downlink control information message scheduling a downlink transmission that comprises a zero-power reference signal for the UE to use for rate matching during the downlink transmission;
means for receiving a signal triggering transmission of an aperiodic reference signal during the downlink transmission;
means for determining whether the UE supports search space sharing;
means for performing, upon determining that the UE supports search space sharing, rate matching around the aperiodic reference signal; and
means for refraining from performing, upon determining that the UE does not support search space sharing, rate matching around the aperiodic reference signal.

10. A non-transitory computer-readable medium storing code for wireless communication at a user equipment (UE), the code comprising instructions executable by a processor to:
receive a downlink control information message scheduling a downlink transmission that comprises a zero-power reference signal for the UE to use for rate matching during the downlink transmission;
receive a signal triggering transmission of an aperiodic reference signal during the downlink transmission;
determine whether the UE supports search space sharing;
perform, upon determining that the UE supports search space sharing, rate matching around the aperiodic reference signal; and
refrain from performing, upon determining that the UE does not support search space sharing, rate matching around the aperiodic reference signal.

* * * * *